US012810028B2

(12) United States Patent
Singh et al.

(10) Patent No.: US 12,810,028 B2
(45) Date of Patent: Nov. 24, 2026

(54) AUTOMATIC DE-IDENTIFICATION OF SENSITIVE DATA WITH CONTEXTUAL RELEXICALIZATION

(71) Applicant: Oracle International Corporation, Redwood Shores, CA (US)

(72) Inventors: Praphul Singh, Pleasanton, CA (US); Brent Edward Beardsley, Bozeman, MT (US); Brad Warren Jacobs, Edmonds, WA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 18/978,650

(22) Filed: Dec. 12, 2024

(65) Prior Publication Data

US 2026/0170174 A1 Jun. 18, 2026

(51) Int. Cl.

| | |
|---|---|
| ***G06F 21/62*** | (2013.01) |
| ***G06F 40/30*** | (2020.01) |
| ***G06N 3/0475*** | (2023.01) |

(52) U.S. Cl.

CPC .......... *G06F 21/6254* (2013.01); *G06F 40/30* (2020.01); *G06N 3/0475* (2023.01)

(58) Field of Classification Search

CPC ............ G06Q 30/0615; G06F 21/6254; G06F 40/30

See application file for complete search history.

(56) References Cited

U.S. PATENT DOCUMENTS

| | | | |
|---|---|---|---|
| 8,719,193 | B1 | 5/2014 | Iannace |
| 11,093,646 | B2 | 8/2021 | Gkoulalas-Divanis |
| 11,580,951 | B2 | 2/2023 | Gkoulalas-Divanis et al. |
| 11,816,243 | B2 | 11/2023 | Lai et al. |

(Continued)

OTHER PUBLICATIONS

Staab, R., Vero, M., Balunović, M., & Vechev, M. (2024). Large language models are advanced anonymizers. arXiv preprint arXiv:2402.13846. (Year: 2024).*

(Continued)

*Primary Examiner* — William R Korzuch
*Assistant Examiner* — Aditya Sriram
(74) *Attorney, Agent, or Firm* — Invoke

(57) ABSTRACT

A computer-implemented technique for relexicalization of sensitive entities in text data is disclosed. The technique obtains de-identification data identifying sensitive entities from input text and clusters these entities based on their representation of the same real-world things. For each cluster, a representative sensitive entity is determined and used to query a database system. The database returns a best matching candidate sensitive entity based on similarity matching, where each candidate is pre-associated with a relexicalized entity. A large language model (LLM) validates the correspondence between the representative and candidate entities within the input text's context. When validated, the technique generates relexicalized text by substituting cluster entities with the associated relexicalized entity. If validation fails, the technique generates a new relexicalized entity, stores the association in the database, and creates relexicalized text using the generated entity. This approach ensures context-aware, consistent replacement of sensitive entities while maintaining semantic appropriateness through multi-step verification.

20 Claims, 10 Drawing Sheets

(56) References Cited

U.S. PATENT DOCUMENTS

| | | | | |
|---|---|---|---|---|
| 12,045,373 | B2 | 7/2024 | Satish et al. | |
| 12,182,307 | B1 | 12/2024 | Li et al. | |
| 12,197,859 | B1 | 1/2025 | Malviya et al. | |
| 12,229,313 | B1 | 2/2025 | Shastry et al. | |
| 12,259,984 | B2 | 3/2025 | Luitjens et al. | |
| 12,566,889 | B2 | 3/2026 | Fisher et al. | |
| 12,572,745 | B1 | 3/2026 | Lee et al. | |
| 2006/0190263 | A1 | 8/2006 | Finke et al. | |
| 2010/0332484 | A1* | 12/2010 | Saito | G06F 21/6254 707/E17.008 |
| 2015/0324413 | A1 | 11/2015 | Gubin et al. | |
| 2016/0117689 | A1 | 4/2016 | Oshry et al. | |
| 2022/0414262 | A1* | 12/2022 | Degioanni | G06N 5/02 |
| 2023/0386456 | A1 | 11/2023 | Weston et al. | |
| 2023/0409749 | A1 | 12/2023 | Li et al. | |
| 2023/0410223 | A1 | 12/2023 | Dobson et al. | |
| 2023/0418978 | A1 | 12/2023 | Sublett et al. | |
| 2024/0005936 | A1 | 1/2024 | Hvidsten | |
| 2024/0119178 | A1 | 4/2024 | Schmidtler et al. | |
| 2024/0185039 | A1 | 6/2024 | Hughes | |
| 2024/0265114 | A1 | 8/2024 | Lambotte | |
| 2025/0148542 | A1 | 5/2025 | Natesan et al. | |
| 2025/0165850 | A1 | 5/2025 | Belton et al. | |
| 2025/0181770 | A1* | 6/2025 | Fraser | G06F 21/6263 |
| 2025/0245384 | A1 | 7/2025 | Wadhawan et al. | |
| 2025/0298921 | A1 | 9/2025 | Krishnasamy et al. | |
| 2025/0307418 | A1 | 10/2025 | Spencer et al. | |
| 2025/0315555 | A1 | 10/2025 | Huang et al. | |
| 2026/0080097 | A1 | 3/2026 | Jadhwani et al. | |

OTHER PUBLICATIONS

"DeID-GPT: Zero-shot Medical Text De-Identification by GPT-4", Retrieved from https://arxiv.org/html/2303.11032v2, Dec. 21, 2023, pp. 1-41.

"Healthcare NLP Release Notes", Retrieved from https://nlp.johnsnowlabs.com/docs/en/spark_nlp_healthcare_versions/licensed_release_notes, Retrieved on Dec. 13, 2024, pp. 1-19.

"Medical Data de-identification", Retrieved from https://imerit.net/medical-data-de-identification-ai-phi-removal-automation/, Retrieved on Dec. 13, 2024, pp. 1-7.

"Presidio: Data Protection and De-identification SDK", Retrieved from https://microsoft.github.io/presidio/, Retrieved on Dec. 13, 2024, pp. 1-3.

"Propel Health AI—Empowering the Healthcare Ecosystem with Data and AI", Retrieved from https://www.propelhealth.ai/platform, Retrieved on Dec. 13, 2024, pp. 1-3.

"Support LLM based de-identification", Retrieved from https://github.com/microsoft/presidio/issues/1234, Dec. 17, 2023, pp. 1-8.

Awati, "Accurate Deidentified PHI with John Snow Labs' Health Information De-identification Service", Retrieved from https://www.johnsnowlabs.com/accurate-medical-data-de-identification-with-john-snow-labs-de-identification-service/, Jan. 26, 2022, pp. 1-16.

Dernoncourt et al., "De-identification of patient notes with recurrent neural networks", Journal of the American Medical Informatics Association, vol. 24, No. 3, 2017, pp. 596-606.

Falconer S., "Advanced Techniques for De-Identifying PII and Healthcare Data", Retrieved from https://www.skyflow.com/post/de-identifying-pii-and-healthcare-data, May 20, 2024, pp. 1-12.

John et al., "LLM Data Privacy: How to Implement Effective Data De-identification", Aug. 20, 2024, pp. 1-11.

Kermany et al., "Automating PHI Removal from Healthcare Data With Natural Language Processing", Retrieved from https://www.databricks.com/blog/2022/06/22/automating-phi-removal-from-healthcare-data-with-natural-language-processing.html, Jun. 22, 2022, pp. 1-14.

Kocaman et al., "Beyond Accuracy: Automated De-Identification of Large Real-World Clinical Text Datasets", Dec. 13, 2023, pp. 1-13.

Madukayil R., "Introducing Segmed's LLM-based Data De-identification Playground", Retrieved from https://www.segmed.ai/resources/blog/llm-based-data-de-identification, Retrieved on Dec. 13, 2024, pp. 1-3.

Mestari et al., "Preserving data privacy in machine learning systems", Computers & Security, vol. 137, 2024, 103605, pp. 1-22.

Neamatullah et al., "Automated de-identification of free-text medical records", BMC Medical Informatics and Decision Making, vol. 8, No. 32, Jul. 24, 2008, pp. 1-17.

Negash et al., "De-identification of free text data containing personal health information: a scoping review of reviews", International Journal of Population Data Science, vol. 8, No. 1, Dec. 12, 2023, pp. 1-12.

Singh et al., "Generation and De-Identification of Indian Clinical Discharge Summaries using LLMs", Jul. 8, 2024, 21 Pages.

Wiest et al., "Anonymizing medical documents with local, privacy preserving large language models: The LLM-Anonymizer", Jun. 13, 2024, pp. 1-29.

Yu et al., "Developing an automated mechanism to identify medical articles from wikipedia for knowledge extraction", International Journal of Medical Informatics, vol. 141, Jul. 13, 2020, 104234, pp. 1-8.

Vithya Yogarajan; A review of Automatic end-to-end De-Identification: Is High Accuracy the Only Metric; ISSN: 0883-9514 (Print) 1087-6545 (Online) Journal homepage: www.tandfonline.com/journals/uaai2 Year: 2020; pp. 1-20.

* cited by examiner

AUTOMATIC DE-IDENTIFICATION OF SENSITIVE DATA WITH CONTEXTUAL RELEXICALIZATION

TECHNICAL FIELD

This disclosure relates generally to computer-implemented data processing. More particularly, this disclosure relates to computer-implemented de-identification of sensitive data.

BACKGROUND

De-identification of sensitive data involves removing or obscuring personally identifiable information and other sensitive information from electronic data records. This process aims to protect privacy while allowing data to be used for research or analysis.

Manual de-identification of sensitive data involves human reviewers meticulously examining and redacting personally identifiable information from individual electronic data records. This process requires extensive time investment, for a document requires careful examination of potential identifiers. Due to the labor-intensive nature of the task requiring skilled personnel with knowledge of privacy regulations and domain terminology, costs escalate rapidly. Scalability becomes a significant challenge when confronted with large datasets. As volume increases, the time and resources required grow linearly, if not exponentially.

Human reviewers are susceptible to fatigue and errors, particularly when dealing with extensive electronic data records. Consistence in applying de-identification rules across a large corpus proves difficult to maintain. Furthermore, manual processes struggle to keep pace with the ever-increasing generation of electronic data records and other sensitive data sources. The inherent limitations of human processing speed create bottlenecks in data flow, impeding timely analysis and research.

While manual review may be suitable for small, sensitive datasets, the approach quickly becomes impractical for big data applications in healthcare and medical research, financial services, education, and government and public administration. Automated or semi-automated de-identification tools offer more viable solutions for handling large-scale sensitive data de-identification tasks though these methods present their own challenges in terms of accuracy and adaptability to diverse data formats.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

One or more embodiments of the present disclosure are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
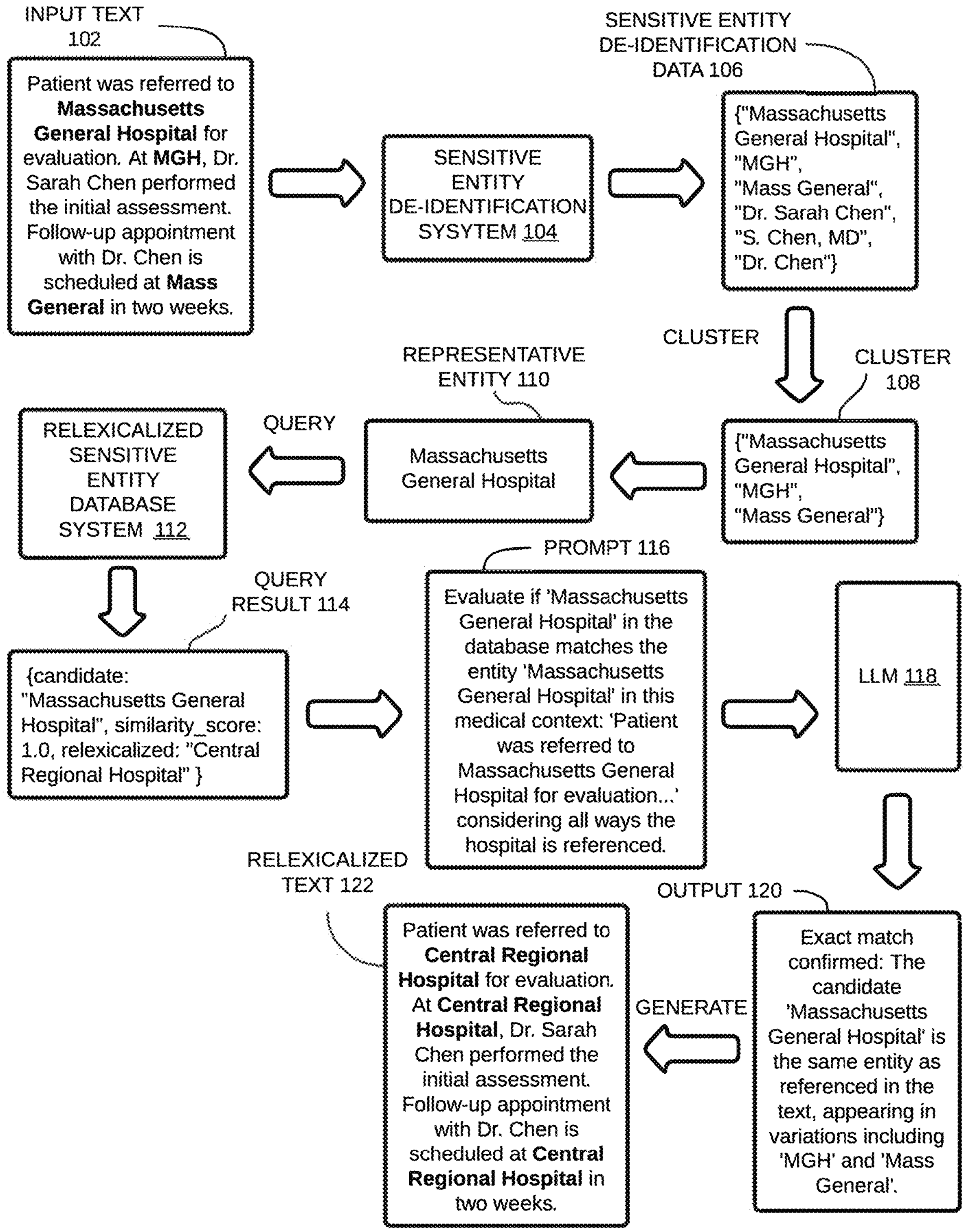
FIG. 1 illustrates a first system and method for contextual relexicalization of sensitive entities in text data in accordance with one or more embodiments.

In the following detailed description, for the purposes of explanation, numerous specific details are set forth to aid understanding of one or more embodiments of the present disclosure. In some instances, an embodiment of the present disclosure may be practiced without one or more of these specific details. In some cases, a described feature of one embodiment of the present disclosure is also a feature of one or more other embodiments of the present disclosure even though the feature is not expressly described with respect to one or more other embodiments. In some embodiments, well-known structures and devices are shown in the figures in block diagram form to avoid unnecessarily obscuring the embodiment.

1. GENERAL OVERVIEW
2. CONTEXTUAL RELEXICALIZATION
   2.1 LLM-BASED CONTEXTUAL RELEXICALIZED ENTITY GENERATION
   2.2 LLM-BASED CONTEXTUAL CLUSTERING
   2.3 LLM-BASED CONTEXTUAL QUERY GENERATION
   2.4 LLM-BASED CONTEXTUAL REPRESENTATIVE ENTITY GENERATION
   2.5 RELEVANCE SCORE CUE
   2.6 QUERY FILTER PREDICATE
3. METHOD FOR CONTEXTUAL RELEXICALIZATION
4. EXAMPLE EMBODIMENTS
5. PRACTICAL APPLICATIONS; ADVANTAGES; IMPROVEMENTS
6. EXAMPLE LLM ARCHITECTURE

7. COMPUTER NETWORKS AND CLOUD NETWORKS
8. HARDWARE OVERVIEW
9. MISCELLANEOUS; EXTENSIONS

1. General Overview

One or more embodiments provide a systematic approach for relexicalizing sensitive entities in text data using a combination of clustering, database querying, and large language model (LLM) validation. A computer-implemented method begins by acquiring de-identification data that includes sensitive entities identified within an initial text. These sensitive entities are then organized into multiple clusters, where a cluster includes one or more related sensitive entities that represent the same real-world thing (e.g., the same person or the same facility). For each cluster, the method determines a representative sensitive entity to represent the one or more related sensitive entities of the cluster.

The method proceeds by querying a specialized database system with the representative sensitive entity. This database system returns one or more candidate sensitive entities based on similarity matching between the representative entity and potential candidates. Each candidate sensitive entity in the database is pre-associated with a corresponding relexicalized (replacement) sensitive entity. The process then uses an LLM by sending a prompt that includes the representative sensitive entity, the candidate sensitive entity, and contextual information from the original text.

When the LLM's output confirms that the candidate sensitive entity appropriately corresponds to the representative sensitive entity within the given context, the method generates new text. This new text is created based on replacing sensitive entities from the cluster with the relexicalized entity associated with the confirmed candidate. The replacement process maintains consistency across the text while preserving contextual appropriateness. The final output includes at least some portion of the original text with the sensitive entities properly substituted.

This approach ensures context-aware and consistent replacement of sensitive entities, addressing challenges in automated de-identification and relexicalization of text data. The method's use of clustering, database lookups, and LLM validation provides multiple layers of verification for appropriate entity replacement.

One or more embodiments described in this Specification and/or recited in the claims may not be included in the General Overview section.

2. Contextual Relexicalization

FIG. 1 illustrates a first system and method for contextual relexicalization of sensitive entities in text data. An input text 102 is processed by a sensitive entity de-identification system 104 to generate sensitive entity de-identification data 106. The sensitive entity de-identification data 106 includes sensitive entities that have been identified within the input text 102. These sensitive entities are organized into clusters 108, where each cluster includes one or more related sensitive entities representing the same real-world entity. For each cluster 108, a representative sensitive entity 110 is determined to represent the cluster's one or more sensitive entities. The representative sensitive entity 110 is used to query a relexicalized entity database system 112, which returns a query result 114 containing a best matching candidate sensitive entity. The best matching candidate sensitive entity is selected based on similarity matching with the representative sensitive entity 110. A prompt 116 is then constructed using the representative sensitive entity 110, the best matching candidate sensitive entity, and contextual information from the input text 102. The prompt 116 is sent to an LLM 118, which generates an output 120 indicating if the best matching candidate sensitive entity appropriately corresponds to the representative sensitive entity 110 within the given context. Based on the LLM's output 120, a relexicalized text 122 is generated by replacing the cluster's sensitive entities with either the relexicalized entity associated with the best matching candidate or a newly generated relexicalized entity, depending on the validation results.

As used herein, a "sensitive entity" represents a discrete unit of information within text that requires protection due to privacy, security, or regulatory considerations. Such an entity may constitute personal identifiers, protected attributes, confidential information, or domain-specific data elements that could enable identification or reveal protected characteristics. Sensitive entities can appear in various forms, including names, numeric sequences, dates, locations, or contextual information that becomes sensitive through association with other elements. These entities may require special handling, such as removal, replacement, or transformation, to maintain confidentiality while preserving the utility of the surrounding text. The classification of an entity as sensitive may depend on multiple factors, including applicable regulations, organizational policies, domain context, and the potential risk of re-identification or unauthorized disclosure.

FIG. 1 depicts an end-to-end medical text de-identification process through relexicalization. The process begins with input text 102, which includes sensitive Protected Health Information (PHI), specifically hospital name variations and physician names. A sensitive entity de-identification data structure 106 stores the target entities for removal. The system implements clustering in element 108 to group related entity variations ("Massachusetts General Hospital", "MGH", "Mass General") as co-referent mentions. Query result 114 demonstrates the entity matching and replacement selection, where "Massachusetts General Hospital" as the representative entity 110 is mapped to "Massachusetts General Hospital" as a candidate entity with a perfect similarity score. Prompt 116 shows the natural language verification step to confirm entity matching accuracy. Output 120 validates the match and acknowledges the multiple reference variations. The final relexicalized text 122 shows consistent replacement of hospital name variants with the relexicalized entity "Central Regional Hospital" while preserving surrounding context and grammatical structure. This systematic relexicalization maintains document coherence by applying uniform entity substitution across co-referent mentions in the input text 102.

The example of FIG. 1 demonstrates relexicalization of the hospital name cluster ("Massachusetts General Hospital", "MGH", "Mass General") to a consistent replacement entity "Central Regional Hospital". A parallel relexicalization process can be applied to the remaining physician name cluster ("Dr. Sarah Chen", "S. Chen, MD", "Dr. Chen"). Following the same methodology, the system would identify co-referent mentions of the physician, cluster these variations, and select an appropriate replacement entity. This additional relexicalization would ensure instances of the physician's name are consistently replaced throughout the text, maintaining both referential clarity and document coherence. The systematic approach to entity replacement across multiple clusters preserves the semantic relationships and readability of the original text while achieving comprehensive de-identification of sensitive entities. Through sequential processing of each identified cluster, the text undergoes complete and consistent relexicalization of protected health information.

The input text 102 represents the original textual data that requires sensitive entity de-identification and subsequent relexicalization processing. This text may contain various types of sensitive entities, such as personal names, locations, organizations, or other confidential information that needs protection. The input text serves as the primary source material for the de-identification system 104 to analyze and identify sensitive entities. The format of the input text can vary, potentially including structured documents, unstructured narratives, or semi-structured records. The input text maintains the original context and relationships between sensitive entities, which becomes crucial for later validation steps using the LLM. Natural language patterns and semantic relationships within the input text provide essential contextual information for ensuring appropriate entity replacement. The input text remains unmodified at this initial stage, preserving original sensitive entities before the systematic de-identification and relexicalization process begins.

In one or more embodiments, the input text 102 comprises structured or semi-structured medical data containing PHI that may require compliant de-identification under the Health Insurance Portability and Accountability Act (HIPAA) regulations. Electronic health record (EHR) segments within the input text may include clinical notes, patient demographics, medication lists, laboratory results, and treatment plans with embedded sensitive entities. When containing Fast Healthcare Interoperability Resources (FHIR) data, the input text follows standardized resource formats that encapsulate patient-specific information across various clinical domains. Names of patients, healthcare providers, facilities, dates of service, and medical record numbers represent sensitive entities within the medical documentation may need to be appropriately de-identified and relexicalized. The input text may preserve critical clinical context and relationships between medical entities, which ensures accurate interpretation during the replacement process. Medical terminology, standard clinical abbreviations, and healthcare-specific formatting may appear throughout the input text alongside the sensitive information. Natural language descriptions of patient encounters, diagnostic assessments, and treatment rationales in the input text may provide semantic context necessary for validating entity replacements. The structured nature of medical documentation in the input text may facilitate systematic identification and consistent replacement of sensitive entities while maintaining the clinical utility of the information.

The sensitive entity de-identification system 104 functions as a computational component that systematically identifies and extracts sensitive entities from the input text 102. The de-identification system may employ various detection algorithms, pattern matching rules, and machine learning models trained to recognize sensitive information within textual content. Named entity recognition (NER) capabilities within the system may enable identification of specific categories of sensitive data, such as personal identifiers, locations, dates, and organization names. The system may utilize regular expressions, gazetteer lists, and contextual analysis to enhance detection accuracy across different text formats and domains. Pre-trained models within the de-identification system can recognize domain-specific sensitive entities, while rule-based components may enforce compliance with relevant privacy regulations and organizational policies. The sensitive entity de-identification system may output structured data identifying the location, type, and/or content of each sensitive entity discovered in the input text. Advanced natural language processing techniques may allow the system to handle variations in text structure, terminology, and entity representation. The system may maintain a mapping between identified sensitive entities and their original locations in the input text, facilitating subsequent clustering and replacement operations. Real-time processing capabilities may enable the system to efficiently handle large volumes of text while maintaining consistent identification accuracy across different types of sensitive information.

The sensitive entity de-identification data 106 comprises the structured output generated by the sensitive entity de-identification system 104 based on analysis of the input text 102. This data structure may include metadata about each identified sensitive entity, including the entity's location within the input text, character offsets, entity type classification, and the original sensitive text value. Annotations within the de-identification data may include confidence scores associated with entity detection and classification decisions. The de-identification data may maintain relationships between related sensitive entities through reference identifiers or positional markers, enabling subsequent clustering operations. Contextual information surrounding each sensitive entity may be preserved within the de-identification data to support validation processes. The data structure may follow a standardized format (e.g., JavaScript Object Notation (JSON) or eXtensible Markup Language (XML)) that facilitates programmatic processing and integration with downstream components of the relexicalization system. Multiple sensitive entities identified from the same input text may be organized within the de-identification data in a manner that preserves their relative positions and relationships. The sensitive entity de-identification data provides an intermediate representation that bridges the initial identification phase with subsequent clustering and replacement operations. Additional attributes in the de-identification data may include entity-specific metadata, such as sensitivity level, regulatory category, or domain-specific classifications.

The clusters represent logical groupings of sensitive entities from the sensitive entity de-identification data 106, where each cluster includes one or more sensitive entities referring to the same real-world entity. In one or more embodiments, these groupings are formed through computational analysis of entity similarities, contextual relationships, and semantic patterns within the input text 102. A cluster may contain multiple variations or references to the same person, such as different forms of a name or various identifiers associated with an individual. In one or more embodiments, the clustering process employs algorithms that analyze string similarities, contextual markers, and entity relationships to determine which sensitive entities should be grouped together. Natural language processing techniques may aid in resolving co-references and identifying when different textual representations refer to the same underlying entity. In one or more embodiments, each cluster maintains internal consistency by grouping those sensitive entities that warrant identical replacement in the final relexicalized text. In one or more embodiments, the clustering mechanism accounts for variations in entity representation, including abbreviations, alternate spellings, or partial references that appear in different sections of the input text. Multiple clusters may be generated from the set of sensitive entities, with each cluster maintaining boundaries to prevent incorrect grouping of unrelated entities. The cluster structure enables consistent replacement of sensitive entities by ensuring that variations of the same real-world entity receive the same relexicalized value during the substitution process.

For example, cluster 108 represents a specific instance from the plurality of clusters, including a subset of sensitive entities from the sensitive entity de-identification data 106 that refer to the same real-world entity. The cluster encapsulates variations, references, and instances of a particular sensitive entity that appear throughout the input text 102. Within cluster 108, sensitive entities are grouped in one or more embodiments based on computational analysis of textual similarities, contextual relationships, and semantic equivalence. In one or more embodiments, the structure of cluster 108 maintains references to the original locations and contexts of each member sensitive entity while establishing their logical relationship as referring to the same underlying entity. Member entities within cluster 108 may include different representations, such as formal names, nicknames, identifiers, or partial references, that correspond to the same real-world person, place, or organization. Metadata associated with cluster 108 may include similarity scores between member entities, confidence levels for entity relationships, and contextual markers supporting the grouping decision. The cluster serves as a unit for ensuring consistent replacement of sensitive entities, for members of cluster 108 will ultimately be replaced with the same relexicalized entity. Programmatic access to cluster 108 enables efficient processing during the subsequent representative entity selection and replacement validation steps.

The representative sensitive entity 110 serves as the canonical form selected from among or generated from the sensitive entities within a cluster 108. This representative entity functions as the primary reference for database querying and validation processes, encapsulating the essential characteristics of related sensitive entities in the cluster. Selecting or generating the representative sensitive entity may involve computational analysis of completeness, frequency, and contextual significance of each member entity within the cluster. Natural language processing techniques may be used to evaluate the linguistic properties and semantic completeness of potential representative entities to identify the most suitable candidate. The representative sensitive entity may exhibit various attributes, such as completeness of form, standard formatting, or prevalence within the input text 102. Algorithmic selection of the representative sensitive entity may consider numerous factors, such as string length, information content, canonical form alignment, and/or contextual prominence. The representative sensitive entity may maintain references to other members of the cluster while providing a single point of comparison for similarity matching and validation operations. Statistical analysis of entity variations within the cluster may influence the selection of the most appropriate representative form. The chosen representative sensitive entity establishes a baseline for determining appropriate replacements through database queries and LLM validation steps.

The relexicalized entity database system 112 functions as a specialized data store and query processing system designed to manage associations between sensitive entities and their corresponding relexicalized forms. This database system implements similarity matching algorithms to compare incoming representative sensitive entities against stored candidate sensitive entities. The system maintains indexed collections of pre-validated entity pairs, where each candidate sensitive entity links to an appropriate relexicalized replacement entity. Database operations within the system utilize optimized query processing to efficiently retrieve candidate matches based on multiple similarity metrics and matching criteria. In one or more embodiments, the relexicalized entity database system incorporates domain-specific knowledge and rules to enhance matching accuracy for different types of sensitive information. Advanced indexing structures within the database system may enable rapid retrieval of potential matches while maintaining scalability for large collections of entity pairs. In one or more embodiments, the system supports dynamic updates to accommodate new entity associations and maintains consistency across related entries. Query processing components of the database system may employ fuzzy matching, phonetic matching, or other approximate string-matching techniques to identify relevant candidate entities. The database system architecture may ensure persistent storage of entity associations while providing high-performance query capabilities for real-time entity replacement operations. Security measures within the database system may protect the stored sensitive information and maintain appropriate access controls for different system components.

In one or more embodiments, the relexicalized entity database system 112 implements a vector database architecture that stores and processes high-dimensional vector representations of sensitive entities. A sensitive entity in the database undergoes transformation into a dense vector embedding through advanced neural network models, capturing semantic and contextual characteristics of the entity. The vector database may employ specialized indexing structures, such as hierarchical navigable small world (HNSW) or inverted file systems (IVF), to enable efficient approximate nearest neighbor search operations. Query processing within the vector database may involve computing similarity scores between the vector representation of the representative sensitive entity and stored entity vectors using metrics, such as cosine similarity or Euclidean distance. The database system may maintain vector embeddings in optimized data structures that support rapid similarity computations across millions of entity vectors. Dimensional reduction techniques may be applied to balance computational efficiency with representation accuracy in the vector space. The vector database may implement clustering algorithms to organize similar entity vectors, accelerating search operations through localized comparison. Advanced caching mechanisms within the database system may optimize frequent queries by maintaining commonly accessed vector representations in memory. The system's architecture may support dynamic updates to vector representations while maintaining consistency in the high-dimensional space. Specialized hardware acceleration, such as GPU-based processing, may enhance the performance of vector similarity computations within the database system.

The query involves interactions with the relexicalized entity database system 112, where a representative sensitive entity is used as the query input. Upon receiving the query, the database system performs similarity-based matching between the representative sensitive entity and potential candidates stored in the database. The matching process generates a query result containing a best matching candidate sensitive entity, which has a pre-established association with a relexicalized entity in the database. The query result represents an association between identification of candidate sensitive entities and their corresponding relexicalized replacements. Subsequent validation through an LLM determines if the best matching candidate sensitive entity appropriately corresponds to the representative sensitive entity within the specific context of the input text. This query architecture enables systematic and context-aware entity substitution while maintaining consistency across related entities.

The matching between a representative sensitive entity and candidate sensitive entities can leverage semantic and/or lexical similarity measures. Semantic similarity examines the underlying meaning and contextual relationships between entities, utilizing word embeddings or deep neural networks to capture conceptual proximity in a high-dimensional space. The semantic matching might employ various models, like Word2Vec, Bidirectional Encoder Representations (BERT), or domain-specific embeddings, to compute similarity scores based on learned representations. Lexical similarity focuses on surface-level textual patterns, using different techniques, such as edit distance calculations, n-gram overlap analysis, or string-matching algorithms. Advanced matching systems may combine both approaches by computing a weighted similarity score that considers both the semantic relatedness and lexical patterns. For example, the system might identify that "Springfield General Hospital" and "SGH Medical Center" have high semantic similarity despite lexical differences, while also recognizing that "Dr. John Smith" and "Dr. Jon Smith" share significant lexical overlap.

Despite high semantic similarity between entities, contextual discrepancies can invalidate apparent matches between a representative sensitive entity and a best matching candidate sensitive entity. For example, the representative sensitive entity "Memorial Hospital" might have high semantic similarity with the candidate "City Memorial Hospital," yet the surrounding context may reveal incompatibilities. The input text might mention specific geographical locations, services, or historical details that conflict with the properties of the candidate entity. Consider a scenario where the input text discusses a rural hospital established in 1950, while the candidate entity represents an urban medical center founded in 2000. Temporal inconsistencies, geographical mismatches, or contradictory attributes in the contextual narrative can render semantically similar entities inappropriate for substitution. Additionally, domain-specific requirements or organizational hierarchies present in the input text may create logical conflicts with the candidate entity's characteristics. These contextual constraints are addressed using an LLM to evaluate the appropriateness of the candidate entity within the specific context of the input text.

The query to the relexicalized entity database system 112 can be structured to include the representative sensitive entity in multiple formats. When using text form, the query includes the literal string representation of the representative sensitive entity, enabling direct string matching and lexical similarity computations. Additionally, or alternatively, the query may include an embedding representation, where the representative sensitive entity has been transformed into a dense vector in a high-dimensional space using different techniques, such as Word2Vec, BERT, or other neural language models. These embeddings capture semantic relationships and contextual meanings more effectively than raw text representations. The choice between text form and embedding representation affects the similarity matching process within the database system. Text-based queries might leverage techniques, like edit distance or n-gram matching, while embedding-based queries can utilize vector operations, such as cosine similarity or nearest neighbor search, in the embedding space. Some implementations may incorporate both formats simultaneously, allowing the database system to perform comprehensive similarity assessments across multiple representation domains.

The query can incorporate a filter predicate to narrow the search space within the relexicalized entity database system 112. Filter predicates define specific constraints that candidate sensitive entities are required to satisfy to be considered for matching. These constraints might include entity type classifications (e.g., only hospitals, only personal names), geographical boundaries, temporal ranges, or domain-specific attributes. For example, a query seeking hospital matches might include a filter predicate limiting candidates to healthcare facilities within a specific state or with a minimum bed capacity. The application of filter predicates may reduce computational overhead by eliminating irrelevant candidates before performing detailed similarity calculations. Such filtering is useful in large-scale databases where exhaustive comparison against candidates would be inefficient. Filter predicates can also incorporate multiple conditions combined through logical operators, enabling precise control over the candidate selection process while maintaining search efficiency through database indexing structures.

Filter predicates enable consistent relexicalization across related input texts by constraining candidate selection based on document-level or collection-level context. When processing texts from a longitudinal patient record, the filter predicate might restrict candidates to those previously used within the same patient family or technical field. This constraint ensures that sensitive entities appearing across multiple patent documents maintain consistent replacement mappings. For example, if a patient name has been relexicalized in an earlier EHR for the patient, the filter predicate can limit candidate selection to preserve this mapping in subsequent EHRs for the patient. The predicate may incorporate document metadata, temporal relationships, or subject matter classifications to maintain coherence across the broader document collection. Such consistency preservation becomes useful in lengthy documents or document series where sensitive entities may appear multiple times in varying contexts. The filter predicate effectively creates a controlled vocabulary of relexicalized entities specific to the document collection, reducing the risk of inconsistent or conflicting replacements that could compromise the logical integrity of the related texts.

The query result 114 represents the output obtained from the relexicalized entity database system 112 after processing a query containing the representative sensitive entity 110. Specifically, the query result 114 includes a best matching candidate sensitive entity identified through similarity matching between the representative sensitive entity and potential candidates stored in the database, subject to conditions of the query filter predicate. This best matching candidate sensitive entity is pre-associated with a corresponding relexicalized entity within the relexicalized entity database. The similarity matching process evaluates the degree of correspondence between the representative sensitive entity's characteristics and those of candidate entities in the database. The query result enables subsequent validation through the LLM 118, which determines if the best matching candidate sensitive entity appropriately corresponds to the representative sensitive entity within the specific context of the input text 102.

In one or more embodiments, the query result 114 incorporates a similarity score that quantifies the matching strength between the representative sensitive entity 110 and the best matching candidate sensitive entity. This similarity score can be computed through multiple complementary approaches. A semantic similarity calculation evaluates the conceptual and contextual alignment between the entities by analyzing their underlying meanings, relationships, and associated attributes. Lexical similarity measurements focus on character-level or token-level matching patterns, potentially employing different techniques, such as edit distance, n-gram overlap, or character-based string similarity metrics. The system may combine both semantic and lexical similarity scores through a weighted aggregation mechanism to produce a comprehensive similarity assessment. For example, the query result might weight semantic similarity at 70% and lexical similarity at 30% to generate a final composite score that leverages both meaning-based and surface-level textual features. This multi-faceted similarity scoring enables more nuanced decision-making in the subsequent LLM validation phase by providing quantitative confidence measures for the proposed entity matches. The similarity score serves as a useful filtering mechanism, allowing the system to prioritize high confidence matches and potentially trigger alternative handling procedures for cases below certain similarity thresholds.

In one or more embodiments, the query result 114 enables an optimized validation pathway based on the computed similarity score between the representative sensitive entity 110 and the best matching candidate sensitive entity. When the similarity score exceeds a predefined high-confidence threshold (e.g., 0.99), the system implements a fast-track processing route that bypasses the LLM validation step. This bypass mechanism operates under the assumption that extremely high similarity scores indicate a sufficiently reliable match, thereby eliminating the computational overhead and latency associated with LLM processing. Conversely, similarity scores falling below the threshold trigger the standard LLM validation process, where the prompt 116 is generated and sent to the LLM 118 for contextual verification. The threshold-based routing approach introduces an efficiency optimization that reduces processing time for high-confidence matches while maintaining robust validation for less certain cases. This dual-path processing strategy can significantly improve system throughput by reserving more intensive LLM-based validation for cases where additional contextual verification adds meaningful value to the relexicalization decision. The system may implement additional threshold bands to trigger different levels of validation or fallback procedures, creating a graduated approach to entity verification based on match confidence.

The prompt 116 comprises a structured input formulation designed to elicit contextual validation from the LLM 118. This prompt consolidates three components: the representative sensitive entity 110 from the cluster 108, the best matching candidate sensitive entity obtained from the query result 114, and contextual information from the input text 102. The organization and presentation of these components within the prompt enable the LLM to perform meaningful comparison and validation. Including the input text (or a relevant portion of the input text) provides contextual information that allows the LLM to evaluate if the candidate sensitive entity appropriately corresponds to the representative sensitive entity within the specific context where replacement will occur. The prompt may incorporate specific instructions or queries that guide the LLM's analysis, such as directives to assess semantic equivalence, contextual appropriateness, or potential conflicts. This constructed prompt structure ensures that the LLM's output 120 provides relevant feedback for determining the suitability of the proposed entity replacement within the given context.

As used herein, a "prompt" represents a formatted input sequence specifically constructed to elicit a targeted response from an LLM. The prompt typically combines instructions, context, and relevant data in a structure that guides the LLM's analysis and output generation. Such formatting may include natural language instructions, examples, constraints, or specific patterns that define the expected processing behavior. The prompt serves as a communication interface between the system and the LLM, encoding task requirements and relevant information in a manner that leverages the LLM's language understanding capabilities. Design choices in prompt construction directly influence the quality and relevance of the LLM's output, making prompt engineering useful for achieving desired results.

The LLM 118 functions as a neural network-based validation system trained on extensive text corpora to understand and evaluate semantic relationships between entities in context. In one or more embodiments, this advanced language model employs transformer architecture with multiple attention layers to process input prompts and generate contextually appropriate outputs. The LLM maintains an extensive parametric understanding of language patterns, entity relationships, and domain-specific knowledge encoded within billions of neural network weights. Sophisticated attention mechanisms within the model enable evaluation of long-range dependencies and complex contextual relationships between entities in the input text. The model processes input sequences through multiple transformer layers, applying self-attention and feed-forward operations to generate contextually informed representations. Specialized tokenization processes within the LLM handle various text formats and entity representations while maintaining semantic understanding. The model architecture supports parallel processing of multiple attention heads, enabling simultaneous evaluation of different aspects of entity relationships. Pre-trained knowledge encoded in the LLM's parameters aids in understanding domain-specific terminology and common entity relationships. The model's decoder generates probabilistic outputs indicating the likelihood of correspondence between candidate and representative entities within the given context. Advanced neural computations within the LLM enable nuanced understanding of entity substitution appropriateness based on surrounding textual context and semantic relationships.

In one or more embodiments, the LLM 118 represents a foundational model trained on diverse textual data across multiple domains, enabling broad language understanding without task-specific training. This general-purpose architecture leverages transfer learning principles, allowing the model to apply pre-trained knowledge to entity validation tasks through careful prompt engineering. The foundational model includes hundreds of billions or even trillions of parameters, encoding extensive knowledge about entity relationships and contextual appropriateness. Zero-shot and few-shot learning capabilities enable the model to perform entity validation without requiring specialized fine-tuning for specific entity types or domains. The LLM's transformer architecture processes prompts using generalized attention mechanisms that adapt to various entity validation scenarios. Sophisticated pattern recognition within the foundational model supports evaluation of entity relationships across different contexts and subject areas. The model's broad training distribution enables understanding of entity relationships in medical, legal, financial, and other specialized domains. Advanced prompting techniques guide the general-purpose model to focus on entity validation tasks while leveraging comprehensive linguistic knowledge. The foundational model maintains robust performance across different writing styles, terminology variations, and contextual scenarios. Careful prompt construction ensures the model's general knowledge can be effectively applied to specific entity validation requirements without compromising accuracy or reliability.

In one or more embodiments, the LLM 118 is implemented as either a fine-tuned model or deployed as an on-premise solution to meet specific requirements. Fine-tuning involves taking a pre-trained base model and further training the model on a specialized dataset of sensitive entity validations. This additional training optimizes the model's weights and biases for the specific task of evaluating correspondence between representative and candidate sensitive entities. The fine-tuning process typically employs techniques, such as gradient descent with a reduced learning rate, to preserve beneficial features from pre-training while adapting to the target domain. On-premise deployment enables organizations to host LLM 118 within their own infrastructure, maintaining complete control over data privacy and security. The on-premise configuration can utilize container orchestration platforms, like Kubernetes, to manage model serving and scaling. Resource allocation for on-premise deployments may account for both inference latency requirements and concurrent request handling capacity. Organizations can implement model quantization and optimization techniques to reduce the computational overhead while maintaining acceptable performance levels for sensitive entity validation tasks. The deployment architecture may incorporate load balancing mechanisms to distribute incoming prompts efficiently across multiple model instances. Both fine-tuned and on-premise implementations can leverage model compression techniques, such as knowledge distillation or pruning, to reduce model size while preserving accuracy in correspondence validation.

The output 120 represents the LLM's assessment of if the best matching candidate sensitive entity appropriately corresponds to the representative sensitive entity within the contextual framework of the input text. This output comprises a structured response that encodes the model's evaluation of semantic compatibility and contextual fit between the entities. The LLM analyzes multiple factors to generate output 120, including contextual relationships, semantic coherence, and potential logical inconsistencies that might arise from entity substitution. Output 120 may provide sufficient signal to determine if the proposed replacement maintains the original meaning and natural flow of the text. The structured nature of output 120 enables automated parsing and decision-making in subsequent processing steps. Specifically, the output includes explicit indicators that can be programmatically interpreted to determine whether to proceed with using the relexicalized entity associated with the best matching candidate or generate a new relexicalized entity. The format of output 120 may include confidence scores, binary decisions, or detailed analysis components that support the correspondence determination. Natural language processing techniques can be applied to extract relevant decision criteria from output 120 when the LLM provides more verbose or descriptive responses.

An LLM output (e.g., output 120) comprises a sequence of tokens generated based on a prompt. The output sequence represents the LLM's prediction of likely tokens based on patterns learned during training and context provided in the prompt. Generated tokens may include words, sub words, punctuation marks, or special tokens defined by the LLM's vocabulary. The output format depends on the specific LLM implementation and can range from natural language text to structured data formats. Token generation typically proceeds sequentially with a new token conditioned on previously generated tokens and the input prompt. The output length may be constrained by maximum token limits or controlled through generation parameters, such as temperature and top-k sampling. Probability distributions over the vocabulary guide token selection at a generation step. The output reflects both general language understanding from pre-training and any specialized knowledge acquired through fine-tuning.

The relexicalized text 122 represents the output document where sensitive entities have been systematically replaced with appropriate substitutes while maintaining contextual coherence. This transformed text incorporates the relexicalized sensitive entities either obtained from the database or newly generated, depending on the LLM validation results. The relexicalized text 122 preserves the grammatical structure, semantic relationships, and readability of the original input text while effectively masking sensitive information. Consistency in entity replacement is maintained throughout the document by applying the same relexicalized entity to occurrences of sensitive entities within a cluster. The generation of relexicalized text 122 involves handling of linguistic features, such as capitalization, plurality, possessive forms, and other grammatical variations of the sensitive entities. Text coherence in the relexicalized output is achieved through context-aware substitution that considers surrounding phrases, sentences, and broader document context. The relexicalized text 122 may include metadata or annotations that track the replacement mappings for validation or future reference purposes. Special consideration in generating relexicalized text 122 may be given to maintaining proper noun agreements, verb tense consistency, and natural language flow across substituted entities.

Figure 2:
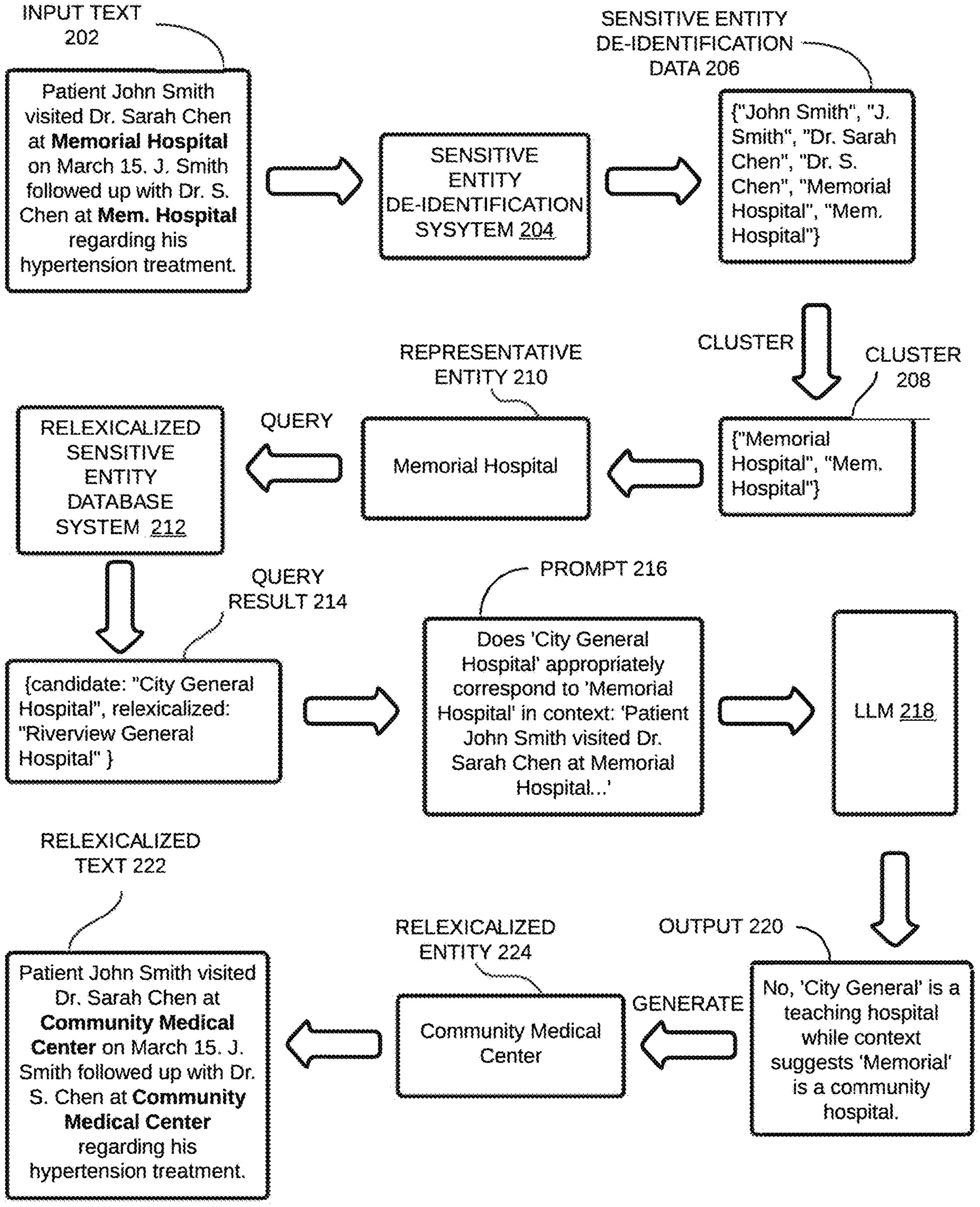
FIG. 2 illustrates a second system and method for contextual relexicalization of sensitive entities in text data in accordance with one or more embodiments.

FIG. 2 illustrates a second system and method for contextual relexicalization of sensitive entities in text data in accordance with one or more embodiments. An input text 202 is processed by a sensitive entity de-identification system 204 to generate sensitive entity de-identification data 206. The sensitive entity de-identification data 206 comprises identified sensitive entities from the input text 202. These sensitive entities are organized into clusters 208, where each cluster includes one or more sensitive entities representing the same real-world entity. A representative sensitive entity 210 is determined for each cluster 208.

The system queries a relexicalized sensitive entity database system 212 using the representative sensitive entity 210. The database system 212 generates a query result 214 containing a best matching candidate sensitive entity based on similarity matching with the representative sensitive entity 210. The best matching candidate sensitive entity is pre-associated with a relexicalized entity in the database system 212.

A prompt 216 is constructed and sent to an LLM 218. The prompt 216 includes the representative sensitive entity 210, the best matching candidate sensitive entity from query result 214, and contextual information from input text 202. The large language model 218 processes the prompt 216 and generates an output 220. Based on output 220, the system determines if the best matching candidate sensitive entity appropriately corresponds to representative sensitive entity 210 within the context.

When correspondence is confirmed, the system generates a relexicalized text 222 by replacing the cluster's sensitive entities with the relexicalized entity associated with the best matching candidate. When correspondence is not confirmed, the system generates a new relexicalized entity 224 for the representative sensitive entity 210. The system then stores an association between representative sensitive entity 210 and the generated relexicalized entity 224 in database system 212. Finally, the system generates relexicalized text using the newly generated relexicalized entity 224.

FIG. 2 illustrates contextual relexicalization through a specific example. The process begins with input text 202, which includes a medical narrative describing patient visits. A sensitive entity de-identification system 204 processes this input text to generate sensitive entity de-identification data 206, identifying six sensitive entities that require relexicalization: "John Smith," "J. Smith," "Dr. Sarah Chen," "Dr. S. Chen," "Memorial Hospital," and "Mem. Hospital."

The system organizes these sensitive entities into clusters 208, with one example cluster containing "Memorial Hospital" and "Mem. Hospital" as variations representing the same healthcare facility. From this cluster, the system determines "Memorial Hospital" as the representative sensitive entity 210. The relexicalized sensitive entity database system 212 processes a query with this representative entity and returns query result 214, which includes "City General Hospital" as the best matching candidate sensitive entity, associated with the relexicalized entity "Riverview General Hospital."

A prompt 216 is constructed and sent to the LLM 218, asking if "City General Hospital" appropriately corresponds to "Memorial Hospital" within the given context. The LLM generates output 220, indicating a mismatch based on hospital types—"City General" being a teaching hospital, while the context suggests "Memorial" is a community hospital. Due to this mismatch, the system generates a new relexicalized sensitive entity 224, "Community Medical Center."

The final relexicalized text 222 demonstrates the complete transformation, where both instances of the hospital references are consistently replaced with "Community Medical Center." This example showcases how the system maintains contextual appropriateness and consistency in entity replacement throughout the text.

The contextual relexicalization process may continue by processing the two additional clusters from the sensitive entity de-identification data 206. The first cluster includes the patient name variations "John Smith" and "J. Smith," with "John Smith" selected as the representative sensitive entity. When querying the relexicalized sensitive entity database system, the system might receive a candidate match, like "Johnathan Smith", with an associated relexicalized entity "Michael Thompson." The LLM validates this candidate by considering various factors, such as name structure, cultural context, and demographic appropriateness within the medical narrative context.

The second cluster encompasses the healthcare provider variations "Dr. Sarah Chen" and "Dr. S. Chen" with "Dr. Sarah Chen" designated as the representative sensitive entity. The database query for this cluster might return a candidate, such as "Doctor Sarah Chen", with an associated relexicalized entity "Dr. Emily Wong." In this case, the LLM would evaluate if the candidate maintains appropriate professional credentials, specialty implications, and cultural congruence within the medical context. The relexicalized text may reflect successful processing of three clusters, where both name variations of the patient consistently become "Michael Thompson," both hospital references become "Community Medical Center," and both physician references become "Dr. Emily Wong." This systematic approach ensures that related entities are replaced consistently while preserving the semantic integrity of the medical narrative.

2.1 LLM-Based Contextual Relexicalized Entity Generation

Figure 3:
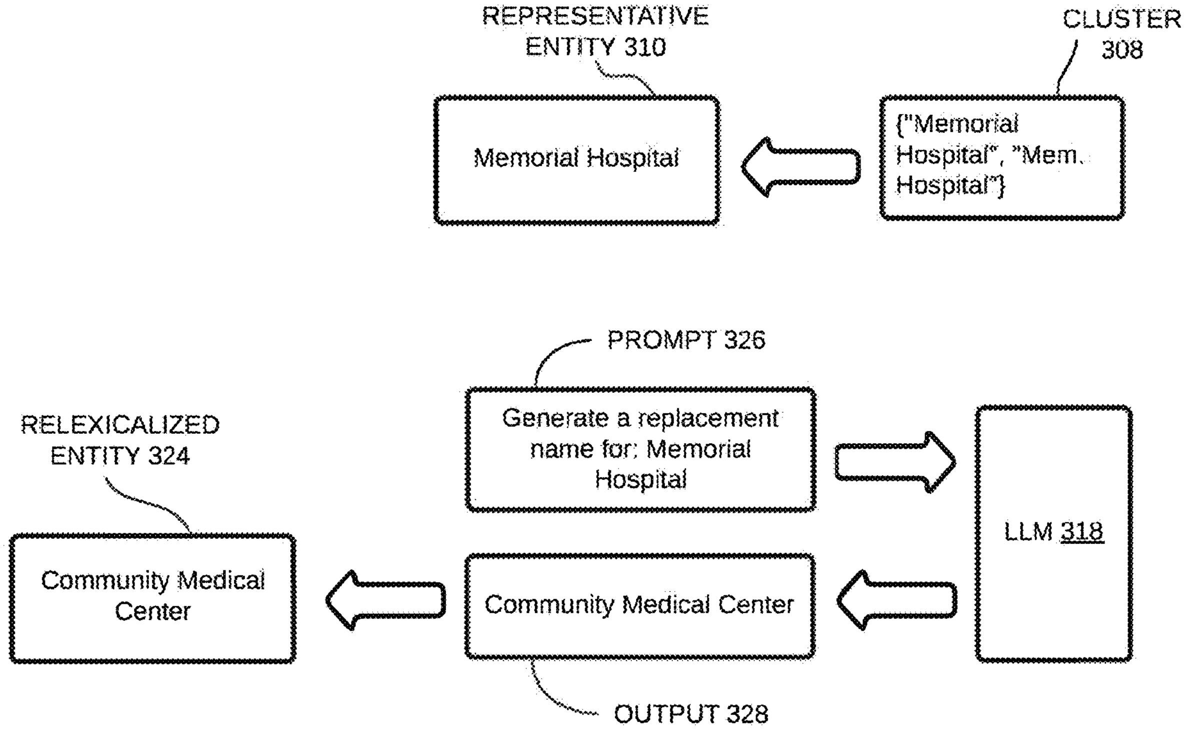
FIG. 3 illustrates a system and method for generating relexicalized entities for sensitive text data based on the example of FIG. 2 in accordance with one or more embodiments.

FIG. 3 illustrates a system and method for generating relexicalized entities for sensitive text data based on the example of FIG. 2 in accordance with one or more embodiments. The process begins when input text containing sensitive entities enters a clustering module where related sensitive entities are grouped into clusters 308. For each cluster, the system determines a representative sensitive entity 310 that best characterizes the grouped entities. When database queries fail to find suitable matches or when matches are invalidated by context checks, the system activates the relexicalization generation pathway. This pathway initiates by formulating a prompt 326 that incorporates the cluster's sensitive entities and/or representative sensitive entity 310. The system then transmits the constructed prompt 326 to LLM 318 for entity generation processing. The LLM 318 processes the input prompt 326 and produces an output 328 containing a contextually appropriate replacement entity. From this output 328, the system extracts and validates the generated relexicalized entity 324. The generated relexicalized entity 324 maintains semantic consistency with the original sensitive entities while providing appropriate anonymization. Upon successful generation and validation, the system updates the relexicalized entity database with the new association between the representative sensitive entity 310 and the generated relexicalized entity 324. This update enables future queries to leverage previously generated relexicalized entities, improving system efficiency and maintaining consistency across multiple documents.

In one or more embodiments, the generation of relexicalized entities incorporates additional contextual information to enhance semantic appropriateness. The system constructs prompt 326 by combining multiple data elements: the sensitive entities from cluster 308, the representative sensitive entity 310, and the original input text. The inclusion of input text provides contextual references for the LLM 318 during entity generation. When the LLM 318 receives prompt 326, the model processes both the sensitive entity information and the surrounding textual context to understand the entity's role and relationships within the broader narrative. This contextual awareness enables the LLM 318 to generate output 328 containing a relexicalized entity 324 that maintains coherence with the document's subject matter, writing style, and domain-specific terminology. For example, when processing medical records, the surrounding clinical context helps ensure generated replacement entities align with relevant medical scenarios and maintain appropriate relationships with other entities in the text. The resulting relexicalized entity 324 thus preserves both semantic validity and contextual consistency while achieving the required level of de-identification. This context-aware approach enhances the quality and appropriateness of entity replacement compared to context-free generation methods.

2.2 LLM-Based Contextual Clustering

Figure 4:
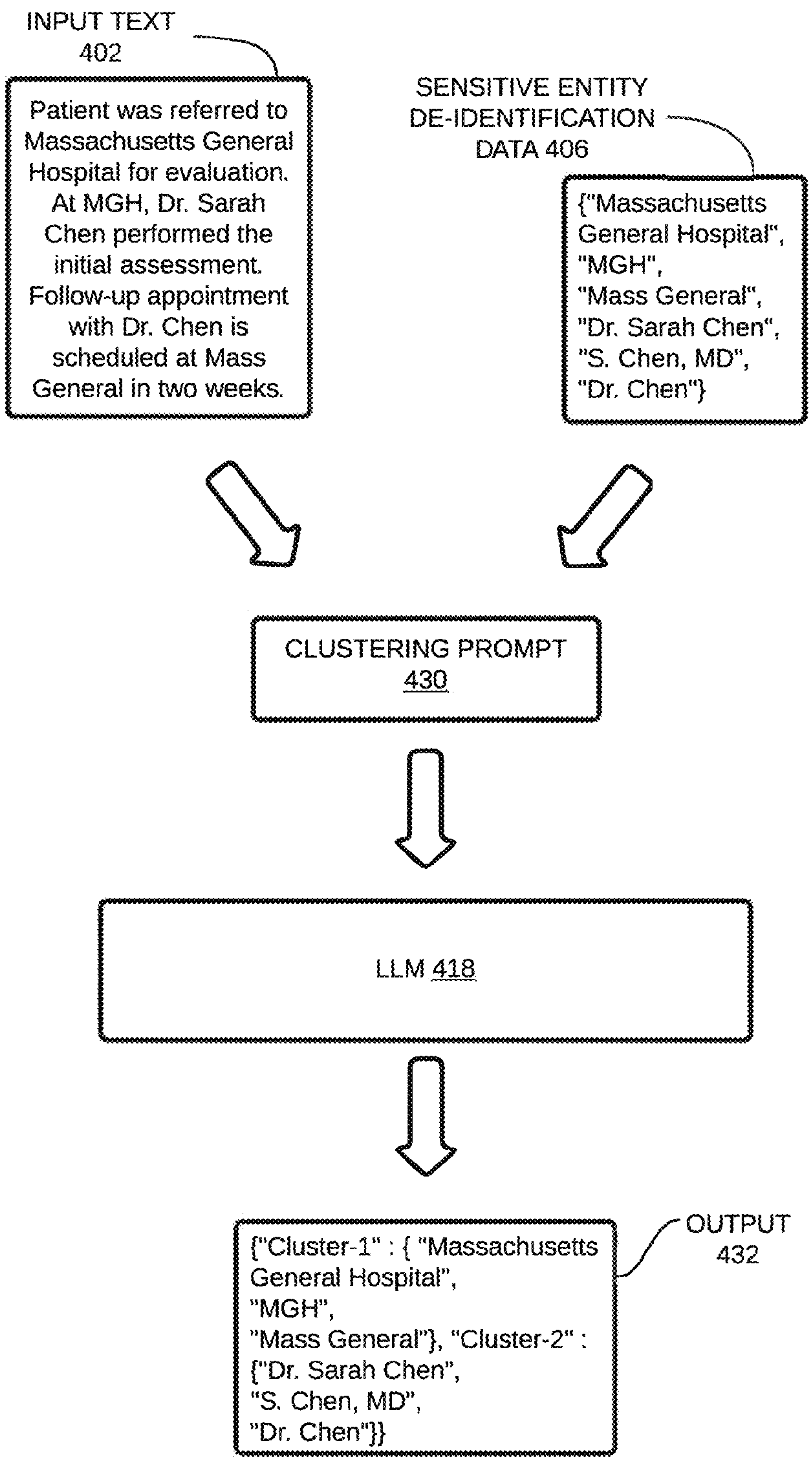
FIG. 4 illustrates a system and method for clustering and relexicalizing sensitive entities in text data based on the example of FIG. 1 in accordance with one or more embodiments.

FIG. 4 illustrates a system and method for clustering and relexicalizing sensitive entities in text data based on the example of FIG. 1. Input text 402 is processed through a sensitive entity de-identification system, which generates sensitive entity de-identification data 406 containing identified sensitive entities. A clustering prompt 430 is constructed by combining the input text 402 and the sensitive entities from the de-identification data 406. The clustering prompt 430 is then sent to the LLM 418. The LLM 418 processes the clustering prompt 430 and produces an output 432 that organizes the sensitive entities into clusters. Each cluster groups together one or more sensitive entities that represent the same real-world entity. These clusters serve as input for subsequent processing steps, where a representative sensitive entity from each cluster undergoes database querying and LLM validation to determine appropriate relexicalized replacements.

The clustering prompt 430 structures instructions to the LLM 418 to analyze relationships between sensitive entities within the context of input text 402. The prompt presents the sensitive entities extracted from the de-identification data 406 and instructs the LLM 418 to identify which sensitive entities refer to the same real-world entity based on contextual evidence found in the input text 402. For example, when the input text 402 includes multiple references to a person using different forms (e.g., full name, last name only, or pronouns), the clustering prompt 430 directs the LLM 418 to group these references together. In one or more embodiments, the prompt's instructions guide the LLM 418 to consider various linguistic cues, co-reference patterns, and semantic relationships present in the input text 402 that suggest entity equivalence. Through this contextual analysis, the LLM 418 generates output 432 containing clusters of related sensitive entities, where each cluster represents a distinct real-world entity that may appear multiple times or in different forms throughout the input text 402. The clustering prompt 430 essentially transforms the LLM 418 into a context-aware entity resolution system that can identify and group related sensitive entities while maintaining the semantic integrity of the original text.

2.3 LLM-Based Contextual Query Generation

Figure 5:
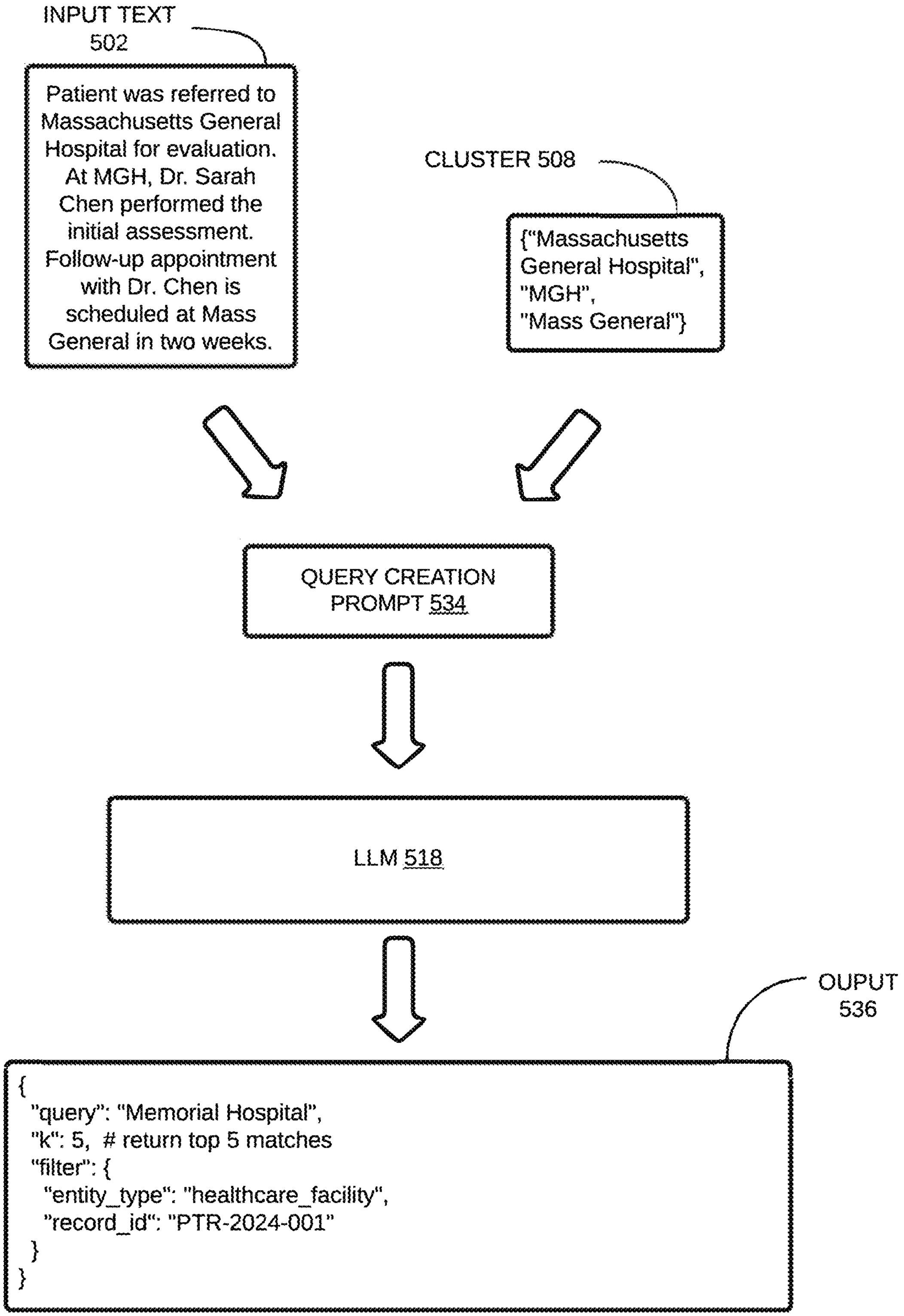
FIG. 5 illustrates a system and method for relexicalizing sensitive entities using a large language model (LLM) based on the example of FIG. 1 in accordance with one or more embodiments.

FIG. 5 illustrates a computer-implemented process for relexicalizing sensitive entities using an LLM based on the example of FIG. 1. The process begins with input text 502 containing sensitive entities that require relexicalization. These sensitive entities are organized into clusters 508, where each cluster includes one or more sensitive entities representing the same real-world entity. A query creation prompt 534 is constructed using the sensitive entities from the cluster 508 and the input text 502. This prompt is then transmitted to the LLM 518 for processing. The LLM 518 processes the query creation prompt 534 and generates an output 536 that forms the basis for constructing the database query. The query creation process leverages the LLM's natural language understanding capabilities to formulate effective database queries that capture the semantic relationships between sensitive entities. The LLM's output 536 helps ensure the generated query will retrieve contextually appropriate candidate entities from the relexicalized entity database.

The query creation prompt 534 provides structured instructions to the LLM 518 to formulate a database query optimized for retrieving relevant candidate entities. The prompt combines context from the input text 502 with the sensitive entities from cluster 508 to guide the LLM's query generation process. Specifically, the prompt instructs the LLM 518 to analyze the semantic relationships and contextual usage of the sensitive entities within the input text 502. The prompt may include explicit directives for extracting key attributes, relationships, and contextual markers that characterize the sensitive entities in cluster 508. These extracted features are then formatted into a query syntax compatible with the relexicalized entity database system. The LLM 518 processes this structured prompt to generate a query that balances exact matching of critical entity attributes with fuzzy matching of contextual elements. By incorporating both the local context from input text 502 and the collective properties of related entities in cluster 508, the generated query maximizes the likelihood of retrieving contextually appropriate candidate entities from the database.

In an alternative embodiment, the query creation prompt 534 receives the representative sensitive entity for the cluster 508 rather than sensitive entities in the cluster. The representative sensitive entity serves as a distilled representation of the cluster's semantic content. The LLM 518 processes this streamlined prompt to generate a database query based on the representative entity's characteristics and attributes. This approach reduces computational overhead by eliminating the need to process multiple related entities during query generation. The query creation prompt 534 instructs the LLM 518 to analyze the representative sensitive entity's key features and transform these features into a structured database query format. Since the representative sensitive entity embodies the essential characteristics of entities within cluster 508, the resulting query maintains search effectiveness while achieving greater efficiency. The LLM 518 can focus on extracting and formatting the most salient attributes from this single representative entity, leading to more focused and computationally efficient database queries.

In one or more embodiments, the query creation prompt 534 incorporates metadata directives that guide the LLM 518 to generate structured query components including filter predicates. The LLM 518 processes these metadata instructions to produce output 536 containing a JSON-formatted query object with multiple fields. The query object includes a primary search term derived from the sensitive entity, a parameter 'k' specifying the desired number of matching results, and a filter predicate containing additional constraints. The filter predicate comprises key-value pairs that define specific metadata criteria, such as the entity type (e.g., "healthcare_facility") and a unique record identifier (e.g., "PTR-2024-001"). This structured approach enables precise filtering of database results based on metadata attributes beyond simple text matching. The query creation prompt 534 can specify various metadata fields relevant to the sensitive entity type, allowing the LLM 518 to generate contextually appropriate filter conditions. By incorporating metadata-driven filtering, the generated queries achieve more targeted and accurate retrieval of candidate entities from the relexicalized entity database system.

2.4 LLM-Based Contextual Representative Entity Generation

Figure 6:
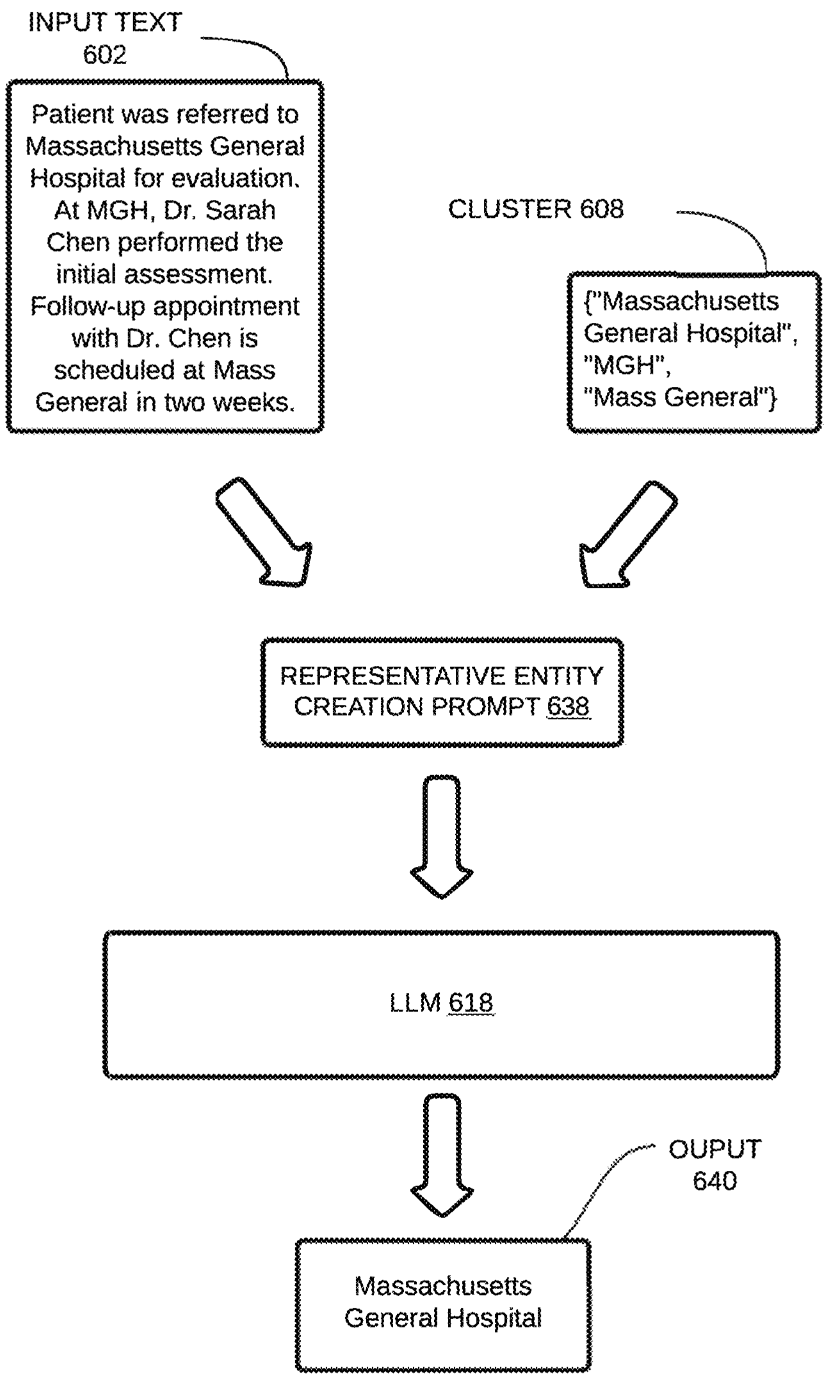
FIG. 6 illustrates a system and method for determining a representative sensitive entity within a relexicalization system based on the example of FIG. 1 in accordance with one or more embodiments.

FIG. 6 illustrates a system and method for determining a representative sensitive entity within a relexicalization system based on the example of FIG. 1. The method begins with input text 602 that includes sensitive entities requiring relexicalization. These sensitive entities are organized into clusters 608, where each cluster includes one or more sensitive entities representing the same real-world entity. The system processes each cluster through a specific workflow to determine an appropriate representative sensitive entity. A prompt 638 is constructed and transmitted to LLM 618. This prompt incorporates both the sensitive entities from the cluster 608 and the original input text 602, providing necessary context for the LLM's analysis. The LLM 618 processes the provided information and generates an output 640. The output 640 includes the determined representative sensitive entity for the cluster, which serves as the canonical form for subsequent relexicalization operations. This representative entity selection process ensures consistent and contextually appropriate entity replacement throughout the text relexicalization workflow.

The query creation prompt 638 communicates specific instructions to the LLM 618 for analyzing and selecting a representative sensitive entity from cluster 608. The prompt includes both the collection of sensitive entities from the cluster and the surrounding context from input text 602, positioning the LLM to understand the semantic relationships between these elements. Within the prompt structure, the LLM receives directives to evaluate the linguistic and contextual patterns associated with each sensitive entity's usage in the input text. Through natural language understanding capabilities, the LLM processes these relationships to identify the most semantically appropriate and syntactically complete form among the cluster's sensitive entities. The prompt's construction guides the LLM to consider various factors, such as completeness of entity representation, frequency of occurrence, and contextual relevance within the input text. This analytical framework enables the LLM to generate output 640 containing a representative sensitive entity that effectively captures the essential characteristics of related entities within cluster 608. The selected representative entity serves as the canonical form for subsequent database queries and relexicalization operations.

The prompt 638 may instruct the LLM 618 to employ different strategies in determining the representative sensitive entity. In one strategy, the LLM evaluates each sensitive entity within cluster 608 to select the most suitable existing entity as the representative based on contextual analysis of input text 602. The selection process considers numerous factors, such as completeness, clarity, and contextual alignment of the existing sensitive entities. Alternatively, the LLM may determine that no single existing entity from cluster 608 adequately represents the collective semantic meaning within the input text context. In such cases, the LLM synthesizes a new representative sensitive entity by combining or reformulating elements from the cluster's existing entities. This synthetic entity creation draws upon the contextual understanding derived from input text 602 and the semantic patterns observed across cluster 608. The LLM's output 640 thus provides either a selected existing entity or a newly created entity that optimally represents the semantic intent of the clustered sensitive entities within the given textual context. This flexibility in representative entity determination ensures optimal semantic preservation during subsequent relexicalization processes.

2.5 Relevance Score Cue

Figure 7:
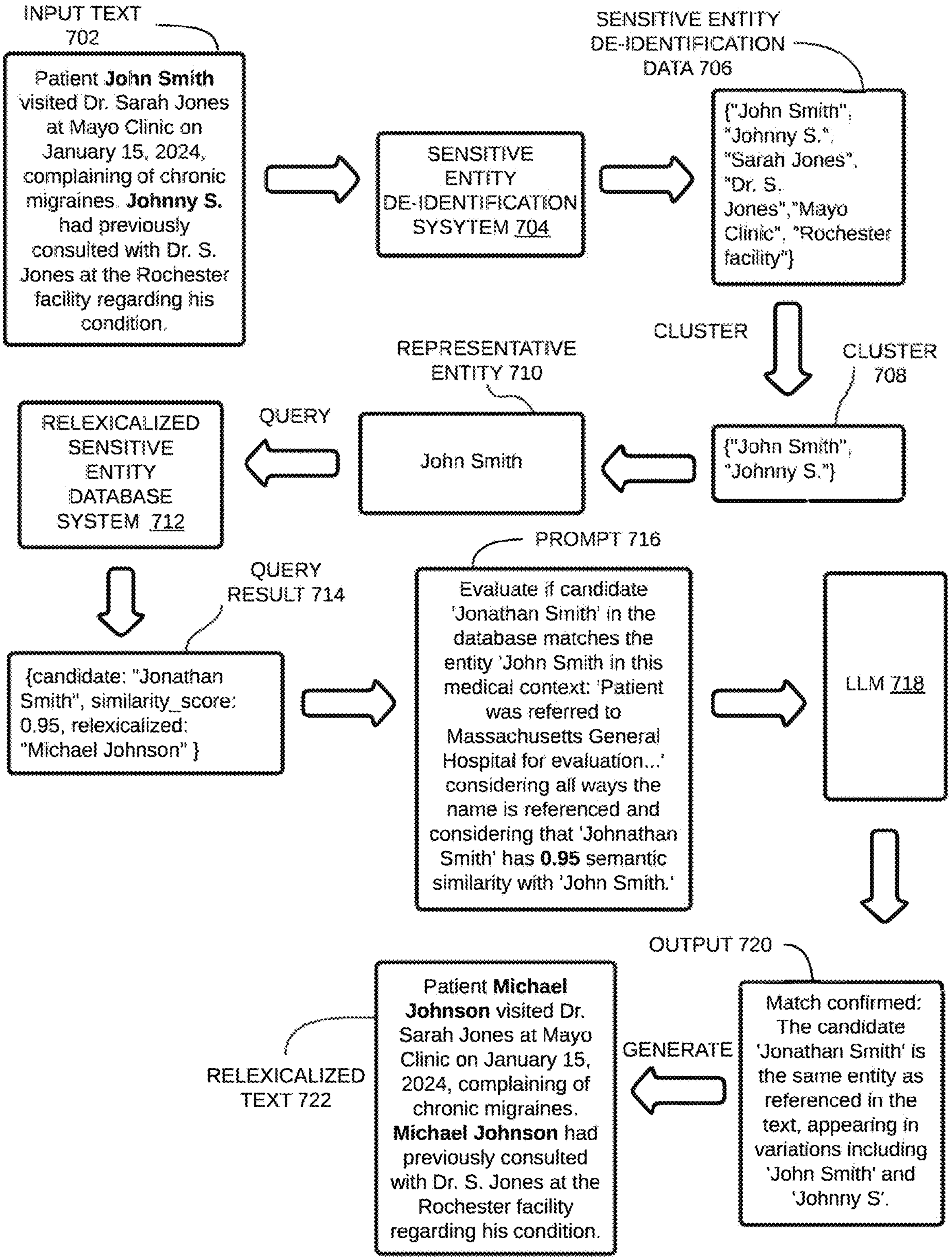
FIG. 7 illustrates a system and method for relexicalizing sensitive entities in text data through a multi-stage process based on the example of FIG. 1 in accordance with one or more embodiments.

FIG. 7 illustrates a system and method for relexicalizing sensitive entities in text data through a multi-stage process based on the example of FIG. 1. The process begins with an input text 702 that undergoes analysis by a sensitive entity de-identification system 704, which produces sensitive entity de-identification data 706. The de-identification data feeds into a clustering operation that generates clusters 708, where each cluster includes one or more sensitive entities representing the same real-world entity. A representative sensitive entity 710 is determined for each cluster. The representative sensitive entity 710 serves as input to a relexicalized entity database system 712, which processes the query and returns a query result 714. The query result includes a relevance score indicating the similarity between the best matching candidate sensitive entity and the representative sensitive entity for the cluster. The system then constructs a prompt 716 that incorporates multiple elements: the representative sensitive entity, the best matching candidate sensitive entity, the input text, and the relevance score from the query result. This comprehensive prompt is sent to an LLM 718 for validation. The LLM processes the prompt and generates an output 720 that determines if the candidate sensitive entity appropriately corresponds to the representative sensitive entity within the input text's context. Based on the LLM's determination, the system generates a relexicalized text 722 by either using the existing relexicalized entity from the database or creating and storing a new one. FIG. 7 emphasizes the integration of relevance scoring into the prompt construction phase, highlighting the system's use of similarity metrics to inform the LLM's validation process.

The LLM 718 uses the relevance score provided in prompt 716 as a quantitative indicator of semantic and/or lexical similarity between the representative sensitive entity and the candidate sensitive entity. This numerical score serves as an additional signal that complements the LLM's semantic understanding capabilities. A higher relevance score suggests stronger string or feature-based similarity, which the LLM can weigh against contextual evidence found in the input text. For example, when validating if a candidate hospital name appropriately corresponds to a representative hospital name, the LLM can factor both the relevance score and contextual clues, such as location, specialties, or affiliated doctors, mentioned in the text. The presence of the relevance score in the prompt enables more nuanced decision-making by allowing the LLM to reconcile cases where string similarity and contextual appropriateness may diverge. When the relevance score is low but contextual evidence strongly supports the correspondence, the LLM might still validate the match. Conversely, a high relevance score alone may not guarantee validation if the contextual evidence suggests a mismatch. This numerical-contextual hybrid approach enhances the robustness of the LLM's validation determinations.

2.6 Query Filter Predicates

One or more embodiments use a specialized filtering mechanism within the relexicalized entity database querying process. When the system sends a query containing a representative sensitive entity to the relexicalized entity database system, the query includes a filter predicate. This filter predicate functions as a constraint on the database search operation. The predicate restricts the search scope to a strict subset of sensitive entities stored within the relexicalized entity database rather than searching the entire collection of stored sensitive entities.

In one or more embodiments, the filter predicate comprises one of three identifier types: a document identifier, a longitudinal patient record identifier, or a patient identifier. A document identifier limits the search to sensitive entities associated with a specific document or set of documents. The longitudinal patient record identifier narrows the search to sensitive entities linked to a particular patient's complete medical history. The patient identifier constrains the search to sensitive entities connected to a specific patient across available records.

This filtering approach enhances search precision and computational efficiency. The system evaluates the similarity between the representative sensitive entity and potential candidates within the restricted subset defined by the filter predicate. After applying the filter and obtaining the best matching candidate sensitive entity, the method proceeds with the LLM validation step as described in the base claim. The LLM still receives the representative sensitive entity, the filtered best matching candidate sensitive entity, and the input text context to determine correspondence. The subsequent relexicalization steps remain unchanged, whether generating new relexicalized entities or using existing associations from the database.

The filter predicate mechanism enhances relexicalization consistency by establishing contextual boundaries for entity replacement across related input texts. When multiple input texts share a common identifier (e.g., document, longitudinal patient record, or patient), the filter predicate ensures that sensitive entities are relexicalized using the same associations within that bounded context. For example, occurrences of a patient name across multiple documents within the same longitudinal patient record will be matched against the same subset of candidate sensitive entities, promoting uniform replacement throughout the patient's medical history.

The system maintains consistency through two mechanisms. First, when a query includes a filter predicate, the relexicalized entity database system restricts candidate matching to previously validated entity pairs within the specified context. This restriction means that if a relexicalized entity has been successfully validated by the LLM for a specific patient identifier, subsequent queries with the same patient identifier will prioritize this established association. Second, in cases where the LLM determines no suitable match exists and generates a new relexicalized entity, the association between the representative sensitive entity and the newly generated relexicalized entity is stored with the context identifier. Future queries within the same context will then have access to this contextually validated association.

This contextual consistency extends beyond single-document boundaries. For longitudinal patient records, the filter predicate ensures that sensitive entity replacements remain consistent across temporal sequences of medical documentation. The predicate-based filtering creates a form of relexicalization memory, where successful entity replacements inform and constrain future replacements within the same contextual scope. By maintaining these contextual boundaries, the system reduces the likelihood of inconsistent relexicalization that could occur if sensitive entities were matched against the entire database without consideration for their contextual relationships.

3. Method for Contextual Relexicalization

Figure 8:
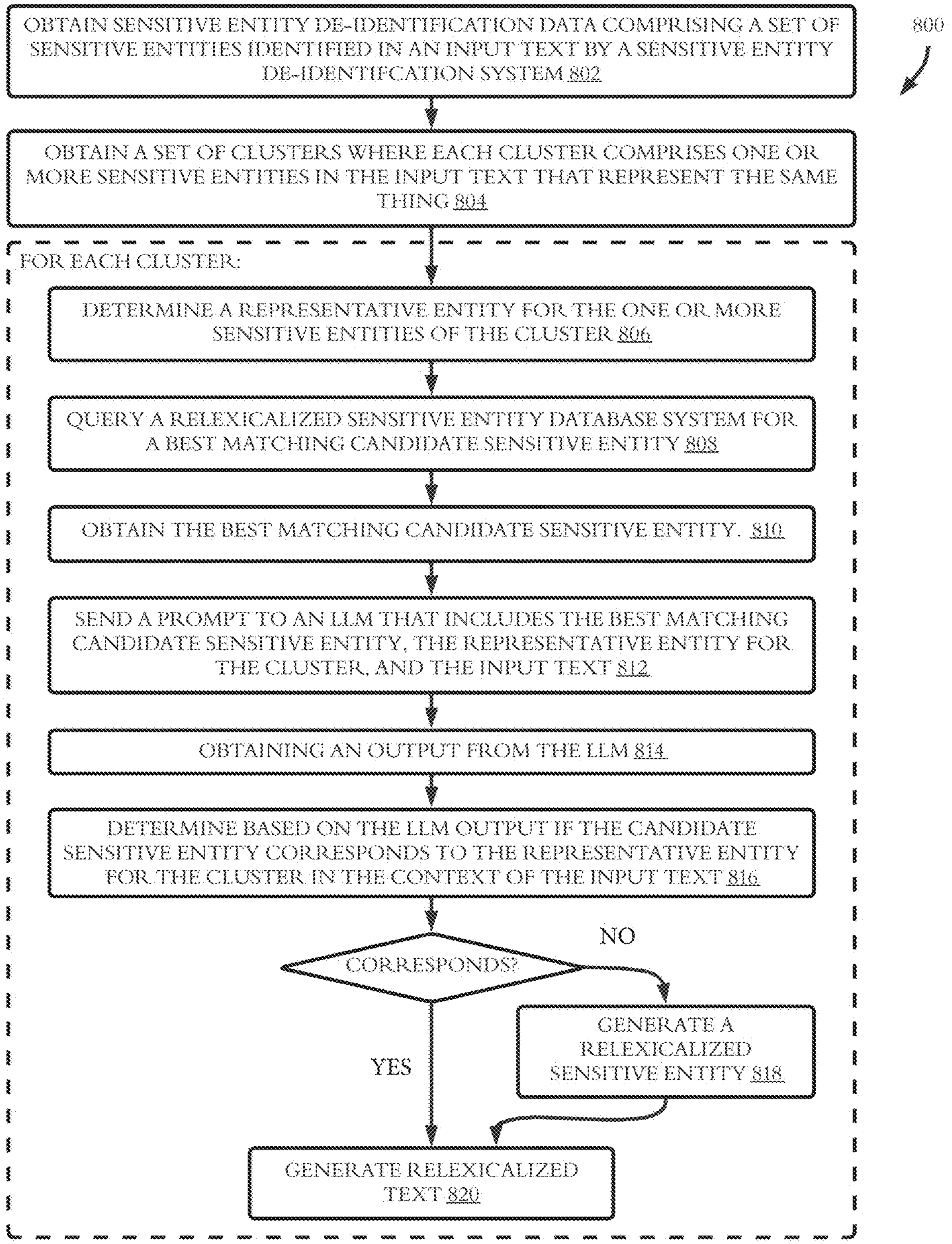
FIG. 8 is a flowchart of a method for contextual relexicalization of sensitive entities in text data in accordance with one or more embodiments.

FIG. 8 is a flowchart of a method 800 for systematic relexicalization of sensitive entities through a multi-step validation process. The method initiates by acquiring de-identification data containing sensitive entities previously identified within an input text. These sensitive entities undergo clustering, where each cluster encompasses one or more related sensitive entities that represent an identical real-world entity.

For each generated cluster, the method determines a representative sensitive entity to serve as the cluster's primary identifier. The representative sensitive entity is then used to query a relexicalized entity database system. This database system returns a best matching candidate sensitive entity based on similarity matching between the representative entity and potential candidates stored in the database. Each best matching candidate sensitive entity maintains a pre-established association with a corresponding relexicalized entity in the database.

The method proceeds by constructing a prompt containing three key elements: the representative sensitive entity, the best matching candidate sensitive entity, and contextual information from the input text. This prompt is sent to an LLM for validation. The LLM's output determines if the best matching candidate sensitive entity appropriately corresponds to the representative sensitive entity within the given textual context.

When the LLM confirms correspondence, the method generates new text by replacing sensitive entities from the cluster with the relexicalized entity associated with the validated best matching candidate. However, if the LLM determines no valid correspondence exists, the method creates (operation 818) a new relexicalized entity specifically for the representative sensitive entity. The method then stores an association between the representative sensitive entity and the newly generated relexicalized entity in the database. Finally, the method produces relexicalized text by substituting sensitive entities in the cluster with either the pre-existing or newly generated relexicalized entity, depending on the LLM validation outcome.

Operation 802 involves obtaining output from a sensitive entity de-identification system that has processed an input text. A sensitive entity de-identification system scans input text to identify and mark entities considered sensitive, such as personal names, addresses, medical conditions, or financial information. The system generates de-identification data that catalogs these detected sensitive entities along with their locations and classifications within the input text. For example, in a medical record stating "Dr. Smith treated John Doe for hypertension at City Hospital," the de-identification system might identify "Dr. Smith," "John Doe," "hypertension," and "City Hospital" as sensitive entities and include these entities in the de-identification data. This de-identification data serves as the foundation for subsequent clustering and relexicalization operations of the method 800. The obtaining (operation 802) step specifically focuses on acquiring this structured set of identified sensitive entities, which will later be processed for consistent replacement while maintaining contextual appropriateness throughout the text.

Operation 804 organizes identified sensitive entities into distinct clusters based on real-world entity correspondence. This clustering operation groups together multiple textual references that point to the same underlying real-world entity. For instance, in a medical document, references such as "Dr. Jane Wilson", "Dr. Wilson", and "J. Wilson, MD", might appear in different locations but refer to the same physician. These variations would be grouped into a single cluster. The clustering process handles various forms of entity references, including abbreviations, aliases, different formatting styles, and context-specific mentions. Each resulting cluster includes one or more sensitive entities from the previously obtained de-identification data with entities in the cluster representing the identical real-world person, place, organization, or other sensitive information type. Multiple clusters are generated during this step with each cluster maintaining clear boundaries between distinct real-world entities. The clustering operation establishes a foundational structure that enables consistent entity replacement across the entire document while preserving the one-to-one mapping between real-world entities and their eventual replacements.

Operation 806 determines a single representative sensitive entity from each previously generated cluster. This representative entity serves as the canonical form for variations of the sensitive entity contained within that cluster. The determination process may determine a complete or informative instance from the cluster to represent variations. For example, in a cluster containing "Dr. Jane Wilson," "Dr. Wilson," and "J. Wilson, MD," the method might select "Dr. Jane Wilson" as the representative sensitive entity because this form includes the most detailed identification information. The representative sensitive entity becomes a reference point for subsequent database querying and LLM validation steps. This determination process ensures that an informative version of the sensitive entity drives the relexicalization decisions while maintaining the relationship to variations within the cluster. The determination of a representative entity streamlines the replacement process by providing a single point of comparison for finding appropriate substitutions that will work consistently across variations in the cluster.

Operation 808 involves querying a specialized database system designed to store and match sensitive entities with their potential replacements. This database interaction begins by constructing a query that includes the previously determined representative sensitive entity for the current cluster. The query is transmitted to the relexicalized entity database system, which maintains a collection of pre-established mappings between sensitive entities and their appropriate replacements. For example, when processing a cluster represented by "Dr. Jane Wilson," the method sends this representative entity to the database system for matching. The database query initiates a search process to find existing sensitive entities that share similar characteristics with the representative entity. This querying step bridges the identified sensitive information and potential pre-existing replacement options stored in the database.

Operation 810 processes the response received from the relexicalized entity database system following the query submission. The database system performs similarity matching operations between the submitted representative sensitive entity and the collection of candidate sensitive entities stored in the database. Through these matching operations, the system identifies and returns the most similar candidate sensitive entity as the best match. For example, when querying with "Dr. Jane Wilson," the database might identify "Dr. Janet Wilson" as the best matching candidate sensitive entity based on name similarity metrics. This best matching candidate comes pre-associated with a corresponding relexicalized entity (such as "Dr. Sarah Thompson") already stored in the database. The query result encapsulates both the best matching candidate sensitive entity and the link to the associated relexicalized entity. The similarity-based matching process ensures that any potential replacement maintains appropriate characteristics of the original sensitive entity while providing a pre-validated substitution option. The acquisition of this query result sets up the subsequent validation step using the large language model.

Operation 812 leverages an LLM to validate the appropriateness of the potential replacement within the specific context. A carefully constructed prompt combines three elements: the representative sensitive entity from the cluster, the best matching candidate sensitive entity returned by the database, and the original input text. For example, a prompt might include the representative entity "Dr. Jane Wilson," the best matching candidate "Dr. Janet Wilson," and the surrounding medical report text that provides context about a cardiologist's specialty and patient interactions. This composite prompt is transmitted to the LLM for analysis. The method then obtains (operation 814) the LLM's output, which includes an assessment of if the candidate entity serves as an appropriate match given the contextual requirements. The inclusion of the full input text in the prompt enables the LLM to evaluate the surface-level similarity between entities as well as the semantic and contextual fit of the potential replacement.

Operation 816 analyzes the LLM's output to make a binary determination about the correspondence between the representative sensitive entity and the best matching candidate. This determination evaluates if the candidate entity maintains semantic consistency and contextual appropriateness within the original text setting. For example, when comparing "Dr. Jane Wilson" with the candidate "Dr. Janet Wilson," the method examines the LLM's assessment of if both entities represent cardiologists with similar professional characteristics mentioned in the text. The determination process considers multiple aspects of correspondence, such as professional role, expertise level, institutional affiliations, or other contextually relevant attributes present in the input text. A positive determination indicates that the candidate entity can serve as a valid basis for replacement, while a negative determination signals the need for generating a new relexicalized entity. This decision point directs the subsequent flow of the method toward either using the pre-existing relexicalized entity or creating a new one.

A conditional branch of the method 800 activates when the LLM validation determines insufficient correspondence between the candidate and representative entities. The method responds by initiating a new entity generation process (operation 820) to create an appropriate relexicalized entity that maintains the necessary contextual characteristics of the representative sensitive entity. For example, when "Dr. Janet Wilson" fails validation as a replacement for "Dr. Jane Wilson" due to mismatched specialties, the method generates a new entity like "Dr. Sarah Thompson" with matching cardiologist credentials. The generated relexicalized entity then becomes permanently associated with the representative sensitive entity through a database storage operation. A command transmitted to the relexicalized entity database system creates this persistent association, enabling future queries to leverage this validated pairing. The method proceeds to generate (operation 822) modified text by systematically replacing sensitive entities from the current cluster with the newly generated relexicalized entity. This replacement operation ensures consistency across variations of the sensitive entity while maintaining contextual appropriateness. The final output preserves the semantic structure and readability of the original text while incorporating the newly generated replacement entity.

A conditional branch of the method 800 executes when the LLM validation confirms appropriate correspondence between the candidate and representative entities. The method proceeds directly to text generation (operation 822) using the pre-existing relexicalized entity from the database. For example, when "Dr. Janet Wilson" passes validation as a suitable match for "Dr. Jane Wilson," the method employs the associated relexicalized entity "Dr. Emily Parker" for replacements. The generation process systematically identifies sensitive entities belonging to the current cluster within the input text. Each occurrence of these sensitive entities, including variations like "Dr. Wilson" or "J. Wilson, MD,"

undergoes replacement with the validated relexicalized entity. This systematic substitution maintains consistency across mentions of the sensitive entity while preserving the original text's structure and meaning. The resulting relexicalized text incorporates the database-supplied replacement entity throughout the document, ensuring uniform treatment of the sensitive information. This branch of the method leverages existing database associations to streamline the replacement process when suitable matches already exist.

In one or more embodiments, a prompt transmission to and output reception from an LLM may involve a multi-layered system architecture facilitating bidirectional communication. The process initiates when a prompt is received by an agent system, which functions as an intermediary interface layer between a client that sends the prompt and the core LLM. This agent system preprocesses the incoming prompt through several potential steps: tokenization of the raw text input, application of any relevant system prompts or context windows, and formatting of the payload according to the LLM's expected input schema. The formatted prompt is then transmitted to the LLM's inference endpoint via API calls over secure network protocols. The LLM processes the input through its transformer (or other suitable) architecture and generates a response, which is returned to the agent system. The agent system then post-processes this output-potentially filtering, formatting, or additional context-before delivering it back to the client. Throughout this process, the agent system may maintain state information about the conversation, manage authentication and rate limiting, log interactions, and handle error conditions. The agent can also implement various control mechanisms, such as prompt injection protections, output moderation, and response validation. This architectural pattern allows for sophisticated interaction patterns while abstracting the complexity of direct LLM communication from clients.

4. EXAMPLE EMBODIMENTS

A detailed example is described below for purposes of clarity. Components and/or operations described below should be understood as one specific example that may not be applicable to certain embodiments. Accordingly, components and/or operations described below should not be construed as limiting the scope of any of the claims.

Consider a medical document containing multiple references to a physician: "Dr. Jane Wilson, a cardiologist at City Hospital, treated patient John Smith. Dr. Wilson prescribed beta blockers. The treatment plan was reviewed by J. Wilson, MD." The method begins by obtaining de-identification data identifying sensitive entities: the physician's name variations, patient name, hospital name, and medical details.

The clustering process groups related sensitive entities. One cluster forms containing ["Dr. Jane Wilson," "Dr. Wilson," "J. Wilson, MD"] since these entities refer to the same physician. The method selects "Dr. Jane Wilson" as the representative sensitive entity for this cluster due to the complete name form and professional title. Additional clusters might form for "John Smith," "City Hospital," and other sensitive entities.

The method queries the relexicalized entity database with "Dr. Jane Wilson." The database returns "Dr. Janet Wilson" as the best matching candidate sensitive entity, which has a pre-associated relexicalized entity "Dr. Emily Parker" in the database. A prompt is constructed containing the representative entity "Dr. Jane Wilson," the candidate "Dr. Janet Wilson," and the full input text providing context about the cardiologist role at "City Hospital".

The LLM analyzes the prompt and confirms the candidate entity appropriately matches the representative entity's context since both represent cardiologists. Upon this validation, the method generates relexicalized text by replacing cluster variations: "Dr. Emily Parker, a cardiologist at [hospital replacement], treated patient [patient replacement]. Dr. Parker prescribed beta blockers. The treatment plan was reviewed by Dr. Parker." The replacement maintains consistency while preserving the medical context and document structure.

Had the LLM instead determined that "Dr. Janet Wilson" was unsuitable (perhaps due to different specialties), the method would have generated a new relexicalized entity (e.g., "Dr. Sarah Thompson"), stored this new association in the database, and used the generated entity for replacements throughout the text. This example demonstrates how the method systematically handles entity variations while ensuring contextually appropriate substitutions.

As another example, consider an administrative document containing employee records: "Robert Johnson (Employee ID: RJ123) from Acme Corporation's Finance Department submitted an expense report. R. Johnson requested a reimbursement of $500. The claim was approved by Bob Johnson, Senior Financial Analyst." The method begins by obtaining de-identification data identifying sensitive entities: the employee's name variations, employee ID, company name, department, role, and financial information.

The clustering process groups related sensitive entities. One cluster forms containing ["Robert Johnson," "R. Johnson," "Bob Johnson"] along with the associated employee ID "RJ123" since these entities refer to the same employee. The method selects "Robert Johnson (Employee ID: RJ123)" as the representative sensitive entity for this cluster due to the complete name form and unique identifier. Additional clusters might form for "Acme Corporation," "Finance Department," and the financial amount.

The method queries the relexicalized entity database with "Robert Johnson (Employee ID: RJ123)." The database returns "Robert Jackson (Employee ID: RJ789)" as the best matching candidate sensitive entity, which has a pre-associated relexicalized entity "Michael Anderson (Employee ID: MA456)" in the database. A prompt is constructed containing the representative entity, the candidate, and the full input text providing context about the senior financial analyst role and expense approval process.

The LLM analyzes the prompt and confirms the candidate entity appropriately matches the representative entity's context, for both represent senior financial analysts with expense approval authority. Upon this validation, the method generates relexicalized text by replacing cluster variations: "Michael Anderson (Employee ID: MA456) from [company replacement]'s Finance Department submitted an expense report. M. Anderson requested reimbursement for [amount replacement]. The claim was approved by Michael Anderson, Senior Financial Analyst." The replacement maintains consistency while preserving the administrative context and document structure.

Had the LLM instead determined that "Robert Jackson" was unsuitable (perhaps due to different role levels or authorities), the method would have generated a new relexicalized entity (e.g., "William Thompson (Employee ID: WT789)"), stored this new association in the database, and used the generated entity for replacements throughout the text. This example demonstrates how the method systematically handles entity variations while ensuring contextually appropriate substitutions in administrative documents.

5. Practical Applications, Advantages, and Improvements

One or more embodiments offer practical applications in healthcare data management systems, particularly in scenarios requiring HIPAA compliance and secure data handling. By automating the process of sensitive entity replacement, one or more embodiments reduce computational overhead traditionally associated with manual or rule-based de-identification systems. The clustering approach minimizes redundant database queries and LLM calls, thereby optimizing system resources and improving processing efficiency. This optimization becomes particularly valuable when processing large medical datasets where traditional methods might require many passes through the data.

In clinical research computing systems, one or more embodiments enable near real-time data anonymization while maintaining data utility. The systematic approach to entity replacement preserves semantic relationships and contextual consistency, which enhance the quality of downstream machine learning models trained on the processed data. Healthcare analytics platforms benefit from one or more embodiments' ability to generate synthetic yet realistic patient identifiers, allowing for more accurate longitudinal studies without compromising patient privacy. The combination of database lookups and LLM validation provides a verification mechanism that reduces error rates in automated de-identification systems.

One or more embodiments advance the technical field of privacy-preserving computing by introducing a hybrid approach that leverages both structured databases and contextual understanding through LLMs. This advancement is particularly relevant for EHR systems, where maintaining referential integrity across different documents while ensuring privacy is useful. The scalable nature of the clustering mechanism enables efficient processing of large-scale medical datasets, making one or more embodiments particularly valuable for research institutions and healthcare organizations handling massive amounts of sensitive patient data. By reducing manual intervention and improving accuracy, one or more embodiments significantly enhance the operational efficiency of medical data processing systems while maintaining high standards of data privacy and utility.

6. Example LLM Architecture

Figure 9:
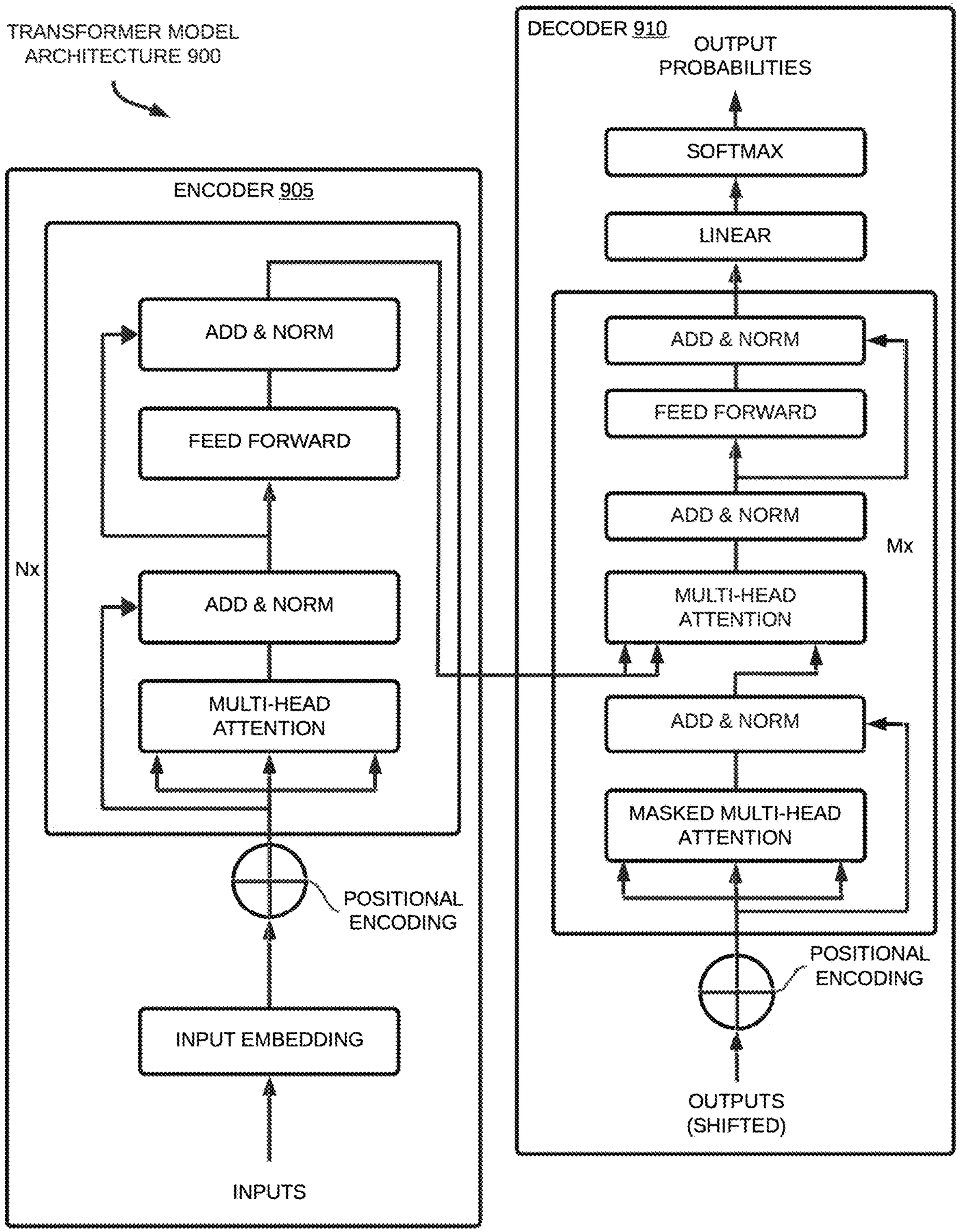
FIG. 9 illustrates an example transformer architecture that may be used in the implementation of an LLM in accordance with one or more embodiments.

FIG. 9 illustrates an example transformer model architecture 900 that may be used in the implementation of an LLM, such as LLM 118, according to an embodiment of the present disclosure.

The transformer model architecture 900 may be a neural network design for natural language processing. At its core, the transformer 900 may encompass an encoder 905 and a decoder 910, both leveraging self-attention mechanisms. The architecture 900 may begin with an input embedding layer that converts tokens into high-dimensional vector representations that may range, for example, from 128 to 1024 dimensions. These embeddings may be augmented with positional encodings to retain sequence order information.

The transformer model architecture 900's input embedding layer serves as the initial processing stage for converting discrete tokens into continuous vector representations. These dense embeddings may occupy a high-dimensional space with dimensionality configurations ranging from 128 to 1024, allowing for rich semantic representation of input tokens. The embedding process maps each token to a unique vector that captures the token's semantic properties in the continuous space. Positional encodings are subsequently added to these token embeddings through element-wise addition, introducing position-dependent signals that encode sequential information. These positional encodings can be implemented using sinusoidal functions or learned parameters, enabling the model to differentiate between tokens based on their positions in the sequence. The combined embeddings preserve both semantic content and sequential order, forming a foundation for the subsequent self-attention mechanisms. This embedding strategy addresses the inherent limitation of transformer architectures in processing sequential data because the self-attention mechanism alone is position-agnostic.

The transformer 900 may include a multi-head, self-attention mechanism. This may allow the model 900 to simultaneously attend to different parts of the input sequence, capturing various types of relationships and dependencies. Each attention head may compute query, key, and value vectors, enabling the model to focus on relevant parts of the input when processing each token. Following the attention layers, the architecture 900 may incorporate feed-forward neural networks with multiple layers and non-linear activation functions.

The multi-head self-attention mechanism forms a component of the transformer architecture 900, enabling parallel processing of input sequence elements. Each attention head operates as an independent attention mechanism, computing three distinct matrices: queries (Q), keys (K), and values (V) through learned linear transformations of the input embeddings. The parallel nature of multiple attention heads allows the model to capture diverse relationship patterns within the same input sequence simultaneously, such as syntactic dependencies, semantic relationships, and long-range contextual connections. The attention computation follows the scaled dot-product attention formula, where the dot product between queries and keys determines alignment scores, followed by scaling and softmax normalization to produce attention weights. These weights are then applied to the value vectors, creating context-aware representations. The feed-forward neural networks following the attention layers encompasses two linear transformations with a non-linear activation function (e.g., Rectified Linear Unit (ReLU) or Gaussian Error Linear Unit (GELU)) between them, processing each position's output independently. This combination of self-attention and position-wise, feed-forward networks enables the model to alternate between gathering contextual information across the sequence and applying complex transformations to individual positions, creating a powerful mechanism for sequence processing.

A masked, multi-head attention mechanism in the decoder 910 of a transformer model 900 may be designed to prevent the model from attending to future tokens during sequence generation. In this mechanism, multiple attention heads may operate in parallel, each computing query (Q), key (K), and value (V) matrices from the input embeddings. The attention scores may be calculated as the dot product of Q and K, scaled by the inverse square root of the dimension of the keys. A lower triangular mask may be applied to these attention scores before softmax normalization, effectively setting the upper triangular elements to negative infinity. This masking may ensure that each position can attend to previous positions in the sequence, maintaining the autoregressive property of the decoder. The masked attention scores may then be used to compute a weighted sum of the value vectors. The outputs from the heads may be concatenated and linearly transformed to produce the attention output. This process may allow the decoder to generate tokens sequentially while considering the previously generated tokens, thus preserving the causal nature of language modeling.

The masked, multi-head attention mechanism in the transformer's decoder 910 implements causal masking to enforce autoregressive generation during sequence processing. Each attention head performs linear projections to create query (Q), key (K), and value (V) matrices from input embeddings through learned weight matrices WQ, WK, and WV respectively. The attention computation follows the formula Attention (Q, K, V)=softmax($QK^T/\sqrt{dk}$)V, where dk represents the dimensionality of the key vectors. A lower triangular mask matrix gets added to the attention scores before softmax normalization. This mask sets upper triangular elements to negative infinity (−∞), effectively zeroing out these positions after the softmax operation. The masking operation ensures strict causality by preventing any position from attending to future positions in the sequence during both training and inference. Following the masked attention computation, the outputs from multiple attention heads are concatenated along the feature dimension and projected through a final linear transformation WO to produce the layer's output. This output maintains the temporal causality required for autoregressive generation while still allowing each position to attend to previous positions in the sequence. The parallelized implementation of multiple attention heads enables the model to capture various aspects of the sequence history simultaneously while the masking mechanism maintains the sequential nature of language generation.

To maintain stable training and mitigate vanishing gradients, the transformer 900 may employ layer normalization after each sub-layer (self-attention and feed-forward networks) and may introduce residual connections. These residual connections may allow unimpeded information flow through the network. The model may encompass multiple (Nx) encoder and decoder (Mx) layers stacked on top of each other, increasing its capacity to learn complex language patterns.

The transformer architecture incorporates stabilization techniques through layer normalization and residual connections. Layer normalization is applied after both the self-attention and feed-forward network sub-layers, normalizing the activations across the feature dimension for each token position. The normalization process computes the mean and variance of the features then scales and shifts the normalized values using learned parameters gamma and beta, effectively standardizing the feature distributions throughout the network. Residual connections, implemented as skip connections, add the input of each sub-layer to the transformed output, creating direct paths for gradient flow during backpropagation. The combination of these components follows the formula LayerNorm(x+Sublayer(x)), where x represents the input and Sublayer represents either the self-attention or feed-forward network.

The stacking of multiple encoder and decoder layers increases the model's capacity logarithmically with respect to sequence length, enabling the capture of hierarchical patterns in language. Each additional layer in the stack provides an opportunity for more abstract feature representation with lower layers capturing local patterns and higher layers learning more complex, global dependencies. The interaction between layer normalization and residual connections creates a well-conditioned optimization landscape, facilitating stable training of deep transformer networks while mitigating the vanishing gradient problem that commonly affects deep neural architectures.

The output layer may involve a linear transformation followed by a softmax function, producing probability distributions over the vocabulary for text generation tasks. This architecture 900's design may allow for efficient parallel processing of input sequences, making it particularly suitable for handling the extensive datasets used in training LLMs.

The output layer of the transformer architecture implements a vocabulary-sized classification mechanism through a linear transformation followed by softmax activation. The linear transformation projects the decoder's hidden states onto a vocabulary-sized space using a weight matrix W∈ $\mathbb{R}$^(d_model×|V|), where d_model represents the model's hidden dimension, and |V| represents the vocabulary size. The subsequent softmax function normalizes these logits into a proper probability distribution across the entire vocabulary, computing P(token_i)=exp(z_i)/Σ_j exp(z_j), where z_i represents the logit for the i-th vocabulary token. This architectural design enables efficient batch processing of input sequences through matrix multiplications, leveraging modern hardware accelerators, like Graphics Processing Unit (GPUs) and Tensor Processing Units (TPUs). The parallel computation capability stems from the self-attention mechanism's ability to process sequence positions simultaneously during the forward pass, requiring O(1) sequential operations compared to the O(n) operations needed in recurrent architectures. The model's parallelization efficiency scales particularly well with increasing sequence lengths, making the architecture advantageous for processing the extensive datasets used in LLM training, which often contain billions of tokens across diverse domains and languages.

In one or more embodiments, architectural variations enhance or modify the standard transformer design for LLM implementations. The Sparse Transformer introduces structured sparsity patterns in the attention mechanism, reducing the quadratic memory complexity to linear complexity through fixed attention patterns. This modification enables processing of much longer sequences while maintaining model quality. Reformer architectures employ locality-sensitive hashing for attention computation, approximating full attention while significantly reducing memory requirements. The rerformer architecture replaces the attention mechanism with kernel-based formulations using random feature decomposition, achieving linear complexity in both compute and memory.

Alternate positional encoding schemes offer various trade-offs. Rotary positional embeddings (RoPE) inject positional information through rotation matrices applied to token embeddings, providing better relative position modeling. Alibi position embeddings add learned bias terms to attention scores, enabling better extrapolation to sequences longer than those seen during training. Some architectures eliminate explicit positional encodings entirely, instead relying on position-aware linear attention mechanisms.

Architecture modifications also target specific computational bottlenecks. Flash Attention optimizes attention computation through careful management of GPU memory access patterns. Mixture of Experts (MoE) architectures incorporate specialized sub-networks activated based on input patterns, increasing model capacity without proportional computation increases. The Gated Linear Unit (GLU) variants replace standard feed-forward networks with gated mechanisms, providing more flexible function approximation. Multi-query attention reduces memory bandwidth requirements by sharing key and value projections across attention heads while maintaining separate query projections.

Some architectures focus on improved training dynamics. DeepNorm modifies the layer normalization scheme to enable stable training of deeper networks. Gradient checkpointing strategies reduce memory requirements during training by recomputing certain activations during backpropagation. State space models offer an alternative to attention mechanisms entirely, using linear state space equations to model sequence relationships with improved computational efficiency.

Alternative architectures for LLM implementation encompass distinct paradigms beyond transformers. Recurrent Neural Networks (RNNs), particularly variants like Long Short-Term Memory (LSTM) networks and Gated Recurrent Units (GRUs), process sequences sequentially through hidden state updates. These architectures maintain explicit temporal dependencies through gating mechanisms, controlling information flow between timesteps. LSTM networks employ three gates—input, forget, and output—along with a memory cell to regulate information persistence. GRUs simplify this structure with reset and update gates while maintaining comparable performance.

Convolutional Neural Networks (CNNs) offer another approach through hierarchical feature extraction. Temporal Convolutional Networks (TCNs) apply dilated convolutions to capture long-range dependencies while maintaining autoregressive properties. The hierarchical structure of TCNs enables parallel processing within each layer while preserving causal relationships. Quasi-Recurrent Neural Networks (QRNNs) combine convolutional and recurrent approaches using convolution for parallel feature extraction followed by a lightweight recurrent pooling mechanism.

Memory-augmented architectures present another paradigm. Neural Turing machines (NTMs) and Differentiable Neural Computers (DNCs) supplement neural processing with external memory arrays, accessed through attention-like mechanisms. These architectures separate computation from memory storage, enabling more explicit modeling of long-term dependencies. Memory Networks similarly incorporate dedicated memory components but with more structured addressing mechanisms.

Continuous-time models offer an alternative perspective on sequence processing. Neural Ordinary Differential Equations (Neural ODEs) model sequence evolution as a continuous-time dynamical system, solving differential equations to process inputs. This approach enables variable timestep processing and potentially more natural handling of temporal relationships. Similarly, Neural Controlled Differential Equations (Neural CDEs) extend this framework to handle irregular time series data while maintaining end-to-end differentiability.

Graph Neural Networks (GNNs) provide yet another alternative by modeling sequences as structured graphs. This approach enables explicit modeling of hierarchical relationships and long-range dependencies through message passing between nodes. Graph-based architectures can capture complex dependencies that may be difficult to model with purely sequential approaches though these architectures may require careful design of graph structure and update rules.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, data storage, a virtual machine, a container, and/or a software application. Network resources are shared amongst multiple clients. Clients request computing services from a computer network independently of each other. Network resources are dynamically assigned to the requests and/or clients on an on-demand basis.

Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. Custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 10:
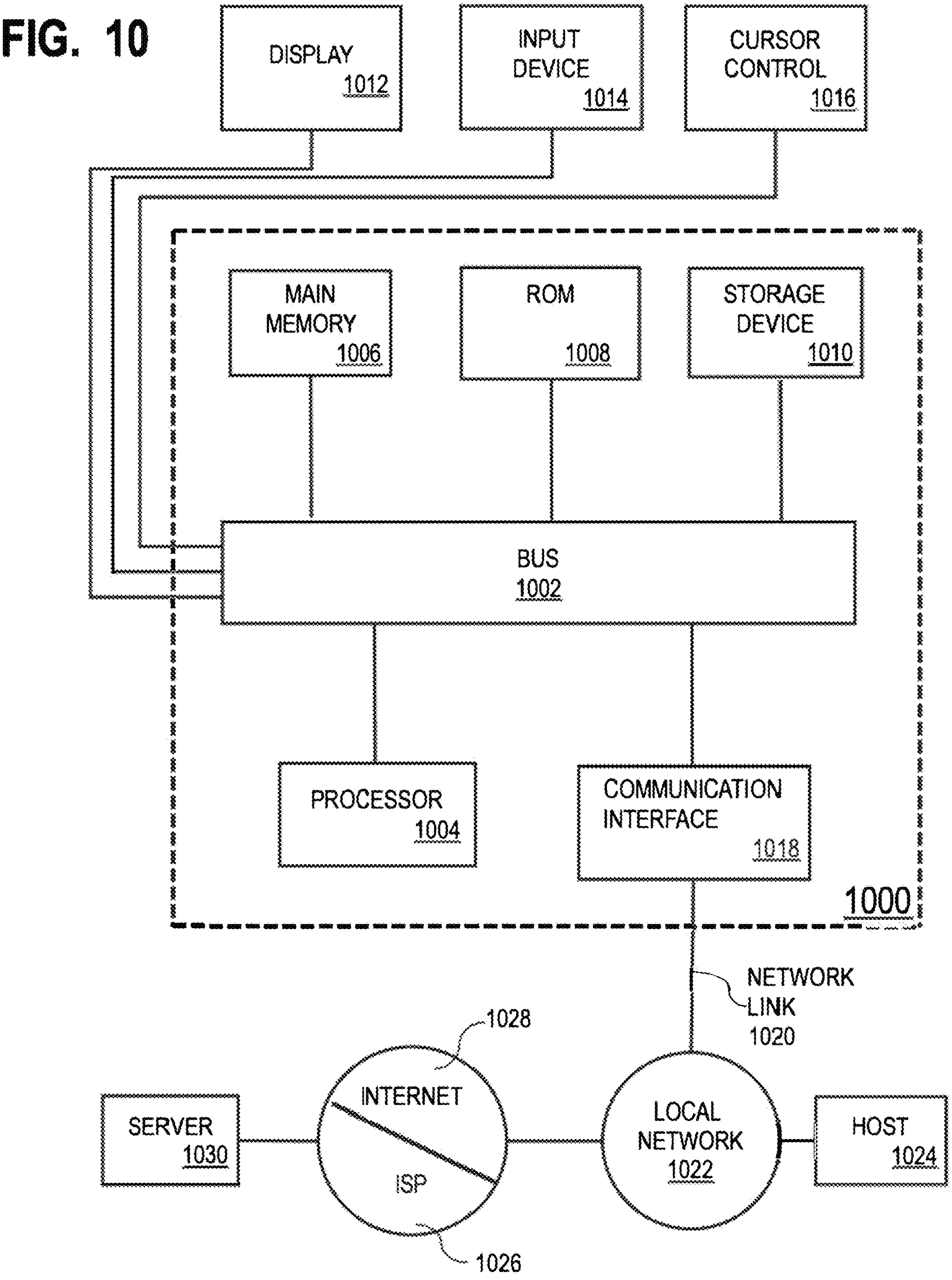
FIG. 10 illustrates an example computer system for use in implementing computer-implemented contextual relexicalization of sensitive entities in text data in accordance with one or more embodiments.

For example, FIG. 10 is a block diagram that illustrates a computer system 1000 upon which an embodiment of the disclosure may be implemented. Computer system 1000 includes a bus 1002 or other communication mechanism for communicating information, and a hardware processor 1004 coupled with bus 1002 for processing information. Hardware processor 1004 may be, for example, a general-purpose microprocessor.

Computer system 1000 also includes a main memory 1006, such as a random-access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or a Solid-State Drive (SSD) is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 based on processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

9. Miscellaneous; Extensions

Unless otherwise defined, all terms (including technical and scientific terms) are to be given their ordinary and customary meaning to a person of ordinary skill in the art and are not to be limited to a special or customized meaning unless expressly so defined herein.

This application may include references to certain trademarks. Although the use of trademarks is permissible in patent applications, the proprietary nature of the marks should be respected, and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

The invention claimed is:

1. One or more non-transitory computer-readable media comprising instructions which, when executed by one or more hardware processors, cause performance of operations comprising:

obtaining sensitive entity de-identification data comprising a set of sensitive entities identified in a first text;

obtaining a plurality of clusters, each cluster of the plurality of clusters comprising one or more sensitive entities of the set of sensitive entities;

determining a first representative sensitive entity for a first cluster of the plurality of clusters, the first cluster comprising a first sensitive entity and a second sensitive entity that is different from the first sensitive entity, the first representative sensitive entity representing at least the first sensitive entity and the second sensitive entity;

sending a first query to a relexicalized entity database system, the first query comprising the first representative sensitive entity for the first cluster;

based on sending the first query, obtaining a first query result for the first query, the first query result comprising a first candidate sensitive entity, the first query result generated by the relexicalized entity database system based on a similarity of the first candidate sensitive entity to the first representative sensitive entity, the first candidate sensitive entity being associated in a relexicalized entity database with a first relexicalized entity;

sending a first prompt to a first large language model (LLM) to obtain a first output, the first prompt comprising the first representative sensitive entity for the first cluster, the first candidate sensitive entity, and at least a portion of the first text, wherein the first output of the LLM validates that the first candidate sensitive entity corresponds to the first representative sensitive entity in context of at least a first portion of the first text;

generating a second text based on substituting the one or more sensitive entities of the first cluster with the first relexicalized entity, wherein the second text comprises at least the first portion of the first text, wherein validating that the first candidate sensitive entity corresponds to the first representative sensitive entity is based at least upon (a) a relevance score reflecting a similarity of the first candidate sensitive entity to the first representative sensitive entity and (b) contextual clues in at least the first portion of the first text.

2. The one or more non-transitory computer-readable media of claim 1, the operations further comprising:

determining a second representative sensitive entity for a second cluster of the plurality of clusters, the second representative sensitive entity representing the one or more sensitive entities of the second cluster;

sending a second query to the relexicalized entity database system, the second query comprising the second representative sensitive entity for the second cluster;

based on sending the second query, obtaining a second query result for the second query, the second query result comprising a second candidate sensitive entity, the second query result generated by the relexicalized entity database system based on a similarity of the second candidate sensitive entity to the second representative sensitive entity, the second candidate sensitive entity being associated in the relexicalized entity database with a second relexicalized entity;

sending a second prompt to a second LLM to obtain a second output, the second LLM being the first LLM or a different LLM, the second prompt comprising the second representative sensitive entity for the second cluster, the second candidate sensitive entity, and at least a second portion of the first text, wherein the second output of the second LLM indicates that the second candidate sensitive entity does not correspond to the second representative sensitive entity in context of at least the second portion of the first text;

based on the second output of the second LLM indicating that the second candidate sensitive entity does not correspond to the second representative sensitive entity in the context of at least the second portion of the first text:

generating a third relexicalized entity; and sending a command to the relexicalized entity database system to store an association between the second representative sensitive entity and the third relexicalized entity in the relexicalized entity database.

3. The one or more non-transitory computer-readable media of claim 2, the operations further comprising:

sending a third prompt to a third LLM, the third prompt comprising the one or more sensitive entities of the second cluster and/or the second representative sensitive entity, the third LLM being the first LLM or the second LLM; and obtaining a third output of the third LLM based on sending the third prompt to the third LLM, the third output comprising the second relexicalized entity.

4. The one or more non-transitory computer-readable media of claim 1, the operations further comprising:

sending a second prompt to a second LLM, the second prompt comprising the set of sensitive entities and at least a second portion of the first text, the second LLM being the first LLM or a different LLM; and obtaining a second output of the second LLM based on sending the second prompt to the second LLM, the second output comprising the plurality of clusters.

5. The one or more non-transitory computer-readable media of claim 1, the operations further comprising:

sending a second prompt to a second LLM, the second prompt comprising the one or more sensitive entities of the first cluster and at least a second portion of the first text, the second LLM being the first LLM or a different LLM; and obtaining a second output of the second LLM based on sending the second prompt to the second LLM, the second output comprising the first query.

6. The one or more non-transitory computer-readable media of claim 1, the operations further comprising:

sending a second prompt to a second LLM, the second prompt comprising the one or more sensitive entities of the first cluster and at least a second portion of the first text, the second LLM being the first LLM or a different LLM; and obtaining a second output of the second LLM based on sending the second prompt to the second LLM, the second output comprising the first representative sensitive entity.

7. The one or more non-transitory computer-readable media of claim 1, wherein the first prompt comprises the relevance score reflecting the similarity of the first candidate sensitive entity to the first representative sensitive entity.

8. The one or more non-transitory computer-readable media of claim 1, wherein the first query comprises a filter predicate that restricts a search of the relexicalized entity database to a strict subset of a set of sensitive entities.

9. The one or more non-transitory computer-readable media of claim 8, wherein the filter predicate comprises an identifier of a document, an identifier of a longitudinal patient record, or a patient identifier.

10. A method comprising:

obtaining sensitive entity de-identification data comprising a set of sensitive entities identified in a first text;

obtaining a plurality of clusters, each cluster of the plurality of clusters comprising one or more sensitive entities of the set of sensitive entities;

determining a first representative sensitive entity for a first cluster of the plurality of clusters, the first cluster comprising a first sensitive entity and a second sensitive entity that is different from the first sensitive entity, the first representative sensitive entity representing at least the first sensitive entity and the second sensitive entity;

sending a first query to a relexicalized entity database system, the first query comprising the first representative sensitive entity for the first cluster;

based on sending the first query, obtaining a first query result for the first query, the first query result comprising a first candidate sensitive entity, the first query result generated by the relexicalized entity database system based on a similarity of the first candidate sensitive entity to the first representative sensitive entity, the first candidate sensitive entity being associated in a relexicalized entity database with a first relexicalized entity;

sending a first prompt to a first large language model (LLM) to obtain a first output, the first prompt comprising the first representative sensitive entity for the first cluster, the first candidate sensitive entity, and at least a portion of the first text, wherein the first output of the LLM validates that the first candidate sensitive entity corresponds to the first representative sensitive entity in context of at least a first portion of the first text;

generating a second text based on substituting the one or more sensitive entities of the first cluster with the first relexicalized entity, wherein the second text comprises at least the first portion of the first text, wherein validating that the first candidate sensitive entity corresponds to the first representative sensitive entity is based at least upon (a) a relevance score reflecting a similarity of the first candidate sensitive entity to the first representative sensitive entity and (b) contextual clues in at least the first portion of the first text, and wherein the method is performed by one or more computer systems comprising one or more hardware processors.

11. The method of claim 10, further comprising:

determining a second representative sensitive entity for a second cluster of the plurality of clusters, the second representative sensitive entity representing the one or more sensitive entities of the second cluster;

sending a second query to the relexicalized entity database system, the second query comprising the second representative sensitive entity for the second cluster;

based on sending the second query, obtaining a second query result for the second query, the second query result comprising a second candidate sensitive entity, the second query result generated by the relexicalized entity database system based on a similarity of the second candidate sensitive entity to the second representative sensitive entity, the second candidate sensitive entity being associated in the relexicalized entity database with a second relexicalized entity;

sending a second prompt to a second LLM to obtain a second output, the second LLM being the first LLM or a different LLM, the second prompt comprising the second representative sensitive entity for the second cluster, the second candidate sensitive entity, and at least a second portion of the first text, wherein the second output of the second LLM indicates that the second candidate sensitive entity does not correspond to the second representative sensitive entity in context of at least the second portion of the first text;

based on the second output of the second LLM indicating that the second candidate sensitive entity does not correspond to the second representative sensitive entity in the context of at least the second portion of the first text:

generating a third relexicalized entity; and sending a command to the relexicalized entity database system to store an association between the second representative sensitive entity and the third relexicalized entity in the relexicalized entity database.

12. The method of claim 11, wherein generating the second relexicalized entity is based on:

sending a third prompt to a third LLM, the third prompt comprising the one or more sensitive entities of the second cluster and/or the second representative sensitive entity, the third LLM being the first LLM or the second LLM; and obtaining a third output of the third LLM based on sending the third prompt to the third LLM, the third output comprising the second relexicalized entity.

13. The method of claim 10, wherein obtaining the plurality of clusters is based on:

sending a second prompt to a second LLM, the second prompt comprising the set of sensitive entities and at least a second portion of the first text, the second LLM being the first LLM or a different LLM; and obtaining a second output of the second LLM based on sending the second prompt to the second LLM, the second output comprising the plurality of clusters.

14. The method of claim 10, wherein generating the first query is based on:

sending a second prompt to a second LLM, the second prompt comprising the one or more sensitive entities of the first cluster and at least a second portion of the first text, the second LLM being the first LLM or a different LLM; and obtaining a second output of the second LLM based on sending the second prompt to the second LLM, the second output comprising the first query.

15. The method of claim 10, wherein generating the first query is based on:

sending a second prompt to a second LLM, the second prompt comprising the one or more sensitive entities of the first cluster and at least a second portion of the first text, the second LLM being the first LLM or a different LLM; and obtaining a second output of the second LLM based on sending the second prompt to the second LLM, the second output comprising the first representative sensitive entity.

16. The method of claim 10, wherein the first prompt comprises the relevance score reflecting the similarity of the first candidate sensitive entity to the first representative sensitive entity.

17. The method of claim 10, wherein the first query comprises a filter predicate that restricts a search of the relexicalized entity database to a strict subset of a set of sensitive entities, and wherein the filter predicate comprises an identifier of a document, an identifier of a longitudinal patient record, or a patient identifier.

18. A system comprising:

at least one device comprising a hardware processor; and instructions which, when executed, cause the system to perform operations comprising:

obtaining sensitive entity de-identification data comprising a set of sensitive entities identified in a first text;

obtaining a plurality of clusters, each cluster of the plurality of clusters comprising one or more sensitive entities of the set of sensitive entities;

determining a first representative sensitive entity for a first cluster of the plurality of clusters, the first cluster comprising a first sensitive entity and a second sensitive entity that is different from the first sensitive entity, the first representative sensitive entity representing at least the first sensitive entity and the second sensitive entity;

sending a first query to a relexicalized entity database system, the first query comprising the first representative sensitive entity for the first cluster;

based on sending the first query, obtaining a first query result for the first query, the first query result comprising a first candidate sensitive entity, the first query result generated by the relexicalized entity database system based on a similarity of the first candidate sensitive entity to the first representative sensitive entity, the first candidate sensitive entity being associated in a relexicalized entity database with a first relexicalized entity;

sending a first prompt to a first large language model (LLM) to obtain a first output, the first prompt comprising the first representative sensitive entity for the first cluster, the first candidate sensitive entity, and at least a portion of the first text, wherein the first output of the LLM validates that the first candidate sensitive entity corresponds to the first representative sensitive entity in context of at least a first portion of the first text;

generating a second text based on substituting the one or more sensitive entities of the first cluster with the first relexicalized entity, wherein the second text comprises at least the first portion of the first text, wherein validating that the first candidate sensitive entity corresponds to the first representative sensitive entity is based at least upon (a) a relevance score reflecting a similarity of the first candidate sensitive entity to the first representative sensitive entity and (b) contextual clues in at least the first portion of the first text.

19. The system of claim 18, the operations further comprising:

determining a second representative sensitive entity for a second cluster of the plurality of clusters, the second representative sensitive entity representing the one or more sensitive entities of the second cluster;

sending a second query to the relexicalized entity database system, the second query comprising the second representative sensitive entity for the second cluster;

based on sending the second query, obtaining a second query result for the second query, the second query result comprising a second candidate sensitive entity, the second query result generated by the relexicalized entity database system based on a similarity of the second candidate sensitive entity to the second representative sensitive entity, the second candidate sensitive entity being associated in the relexicalized entity database with a second relexicalized entity;

sending a second prompt to a second LLM to obtain a second output, the second LLM being the first LLM or a different LLM, the second prompt comprising the second representative sensitive entity for the second cluster, the second candidate sensitive entity, and at least a second portion of the first text, wherein the second output of the second LLM indicates that the second candidate sensitive entity does not correspond to the second representative sensitive entity in context of at least the second portion of the first text;

based on the second output of the second LLM indicating that the second candidate sensitive entity does not correspond to the second representative sensitive entity in the context of at least the second portion of the first text:

generating a third relexicalized entity; and sending a command to the relexicalized entity database system to store an association between the second representative sensitive entity and the third relexicalized entity in the relexicalized entity database.

20. The system of claim 19, the operations further comprising:

sending a third prompt to a third LLM, the third prompt comprising the one or more sensitive entities of the second cluster and/or the second representative sensitive entity, the third LLM being the first LLM or the second LLM; and obtaining a third output of the third LLM based on sending the third prompt to the third LLM, the third output comprising the second relexicalized entity.

* * * * *